United States Patent [19]
Garin et al.

[11] Patent Number: 5,901,183
[45] Date of Patent: May 4, 1999

[54] SIGNAL CORRELATION TECHNIQUE FOR A RECEIVER OF A SPREAD SPECTRUM SIGNAL INCLUDING A PSEUDO-RANDOM NOISE CODE THAT REDUCES ERRORS WHEN A MULTIPATH SIGNAL IS PRESENT

[75] Inventors: Lionel Garin, Palo Alto, Calif.; Mark Zhodzicshsky, Moscow, Russian Federation; Victor Veitsel, Moscow, Russian Federation; Stanislov Sila-Novatisky, Moscow, Russian Federation; Farbod Kamgar, Campbell, Calif.

[73] Assignee: Magellan Corporation, Santa Clara, Calif.

[21] Appl. No.: 08/719,611

[22] Filed: Sep. 25, 1996

[51] Int. Cl.$^6$ ............... H04L 27/06; H04L 1/02
[52] U.S. Cl. ............... 375/343; 375/347
[58] Field of Search ............... 375/208, 343, 375/347, 267; 455/137, 139; 345/210, 211, 326; 342/350, 378

[56] References Cited

U.S. PATENT DOCUMENTS

| | | | |
|---|---|---|---|
| 4,809,005 | 2/1989 | Counselman, III | 342/352 |
| 5,347,536 | 9/1994 | Meehan | 375/285 |
| 5,390,207 | 2/1995 | Fenton et al. | 375/209 |
| 5,402,441 | 3/1995 | Washizu et al. | 375/208 |
| 5,402,450 | 3/1995 | Lennen | 375/343 |
| 5,414,729 | 5/1995 | Fenton | 375/209 |
| 5,493,588 | 2/1996 | Lennen | 375/343 |
| 5,537,121 | 7/1996 | Lennen | 342/357 |
| 5,630,208 | 5/1997 | Enge et al. | 455/65 |
| 5,734,674 | 3/1998 | Fenton et al. | 375/206 |

FOREIGN PATENT DOCUMENTS

| | | |
|---|---|---|
| 552975A2 | 7/1993 | European Pat. Off. . |
| 1367815 | 9/1987 | Russian Federation . |
| WO9514937 | 6/1995 | WIPO . |

OTHER PUBLICATIONS

Meehan, T.K. "Processing in a GPS Receiver to Reduce Multipath Errors", New Technology Report, Assembled by: JPL Technology Utilization Office, pp. i, 1–2, 1a–9a (Oct. 1994).

Weill, L. et al., "Achieving Theoretical Accuracy Limits For Pseudo–ranging In The Presence Of Multipath," *Proceedings of ION GPS–95 Meeting* (Sep. 12–15, 1995) 10 pages.

Braasch, M., "Courses 455: GPS and DGPS Multipath Effects and Modeling," *Proceedings of ION GPS–95 Tutorial,* Navtech Seminars, Inc. (Sep. 11, 1995) pp. 1–118.

*Primary Examiner*—Tesfaldet Bocure
*Attorney, Agent, or Firm*—Majestic, Parsons, Siebert & Hsue

[57] ABSTRACT

A receiver of a radio frequency signal having a pseudo-random noise (PRN) code modulated on a carrier, and techniques of processing such a signal that are especially adapted for ranging applications. Such an application is in a global positioning system (GPS or GLONASS) receiver. Both of the receiver DLL code and PLL carrier loops include a loop component that senses an error in its main loop caused by the presence of a multipath signal. The main loop is continuously adjusted by this sensed error, thereby causing the loop to track more precisely and minimize the effect of the multipath signal. The result is a more accurate range measurement.

9 Claims, 19 Drawing Sheets

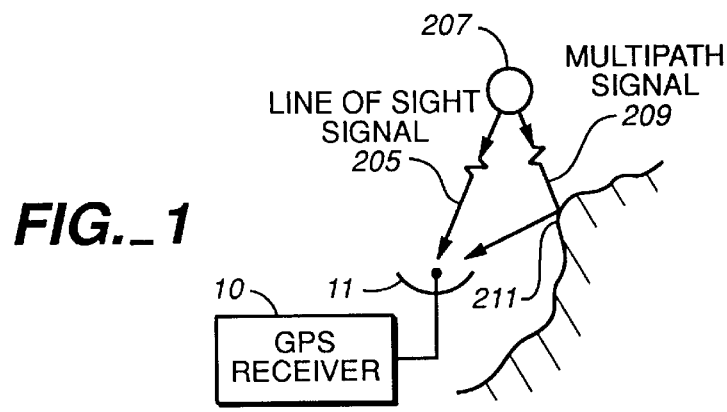
FIG._1
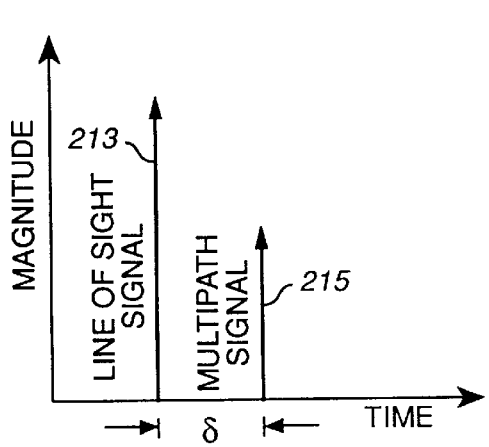
FIG._2
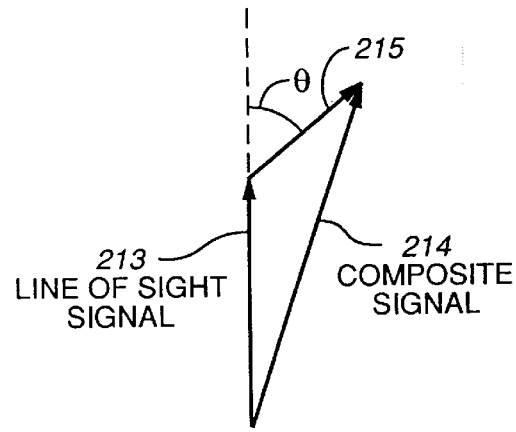
FIG._3
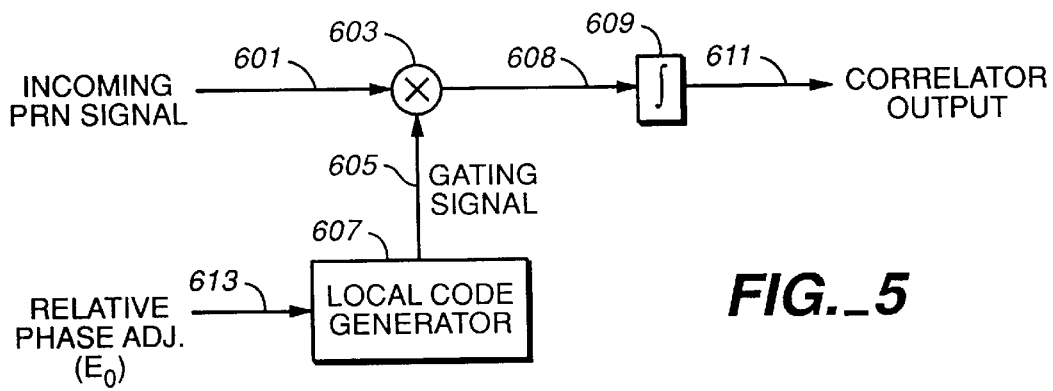
FIG._5

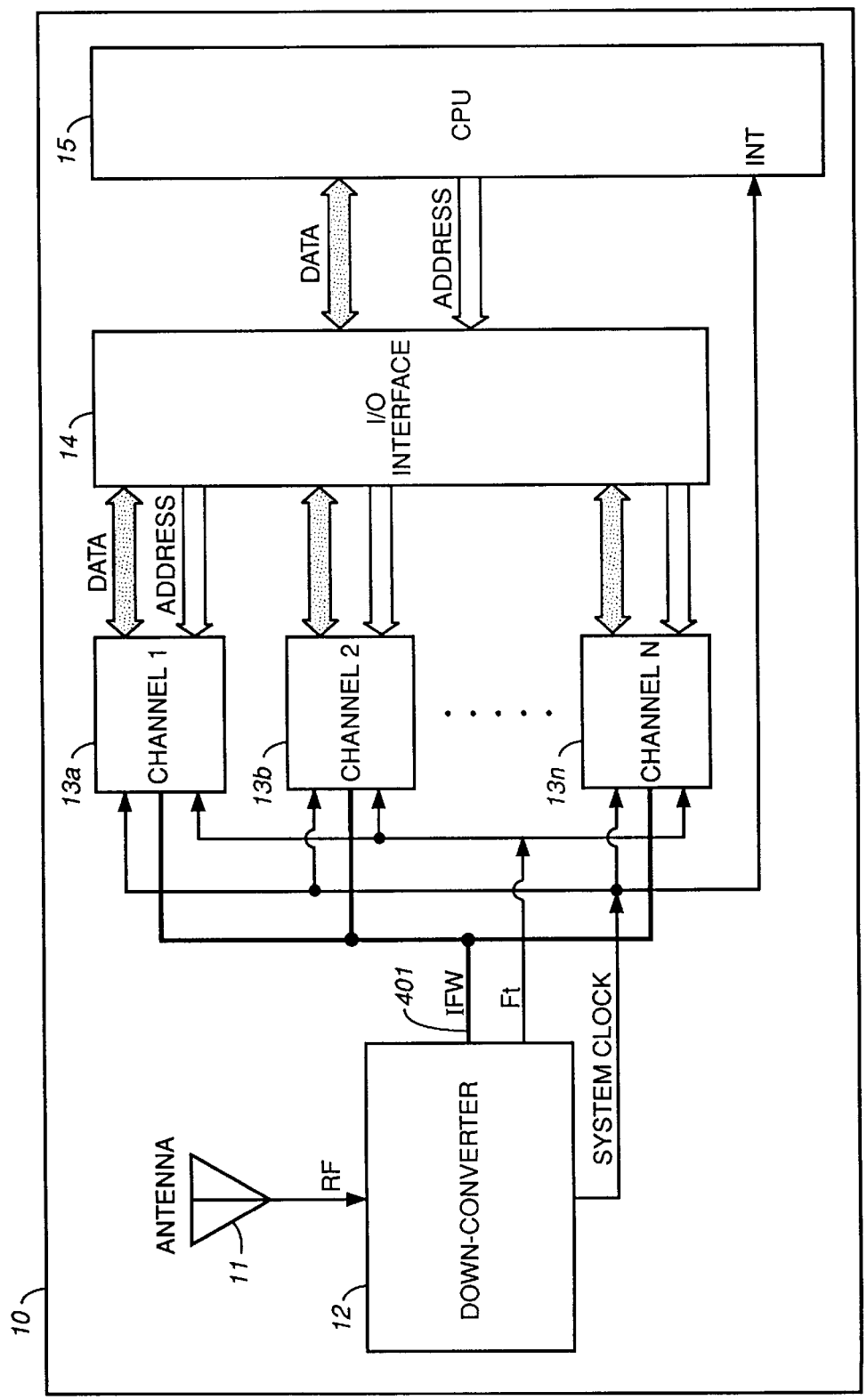
FIG._4

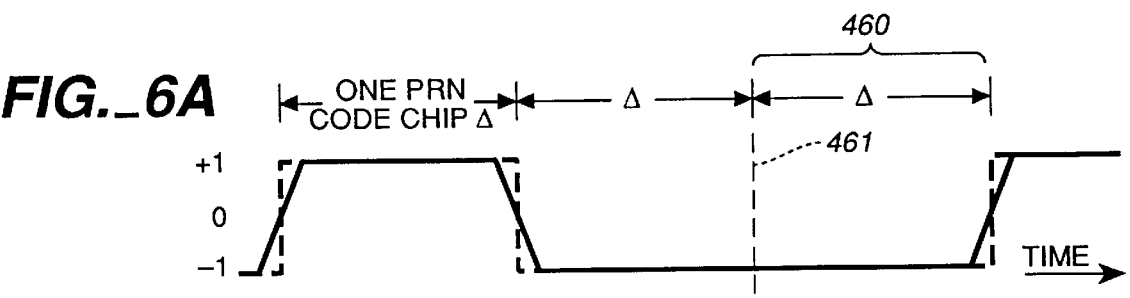
FIG._6A
FIG._6B
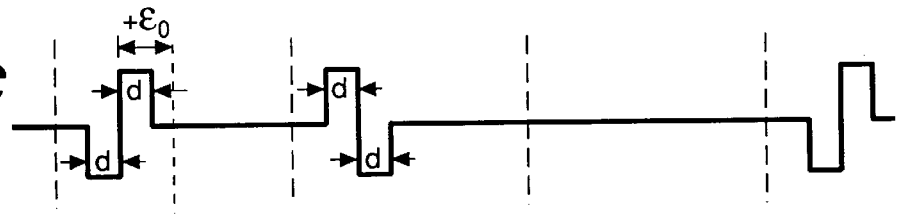
FIG._6C
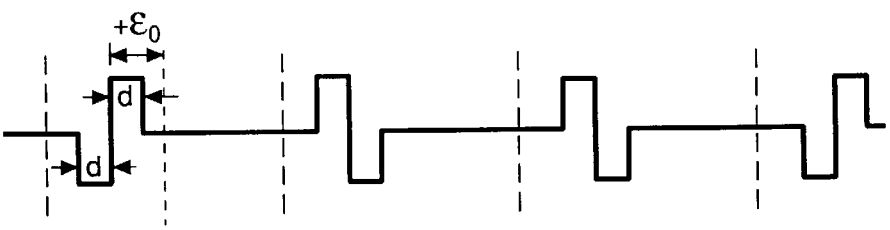
FIG._6D
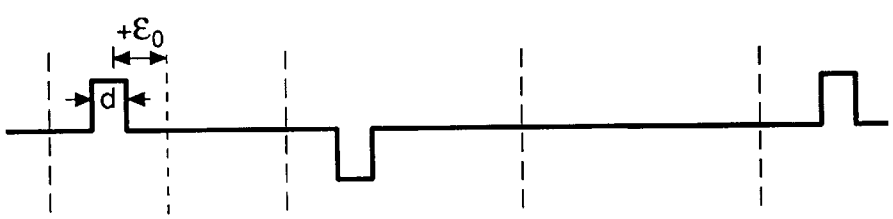
FIG._6E
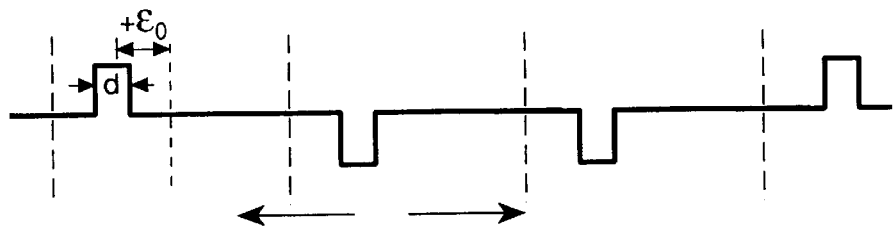
FIG._6F

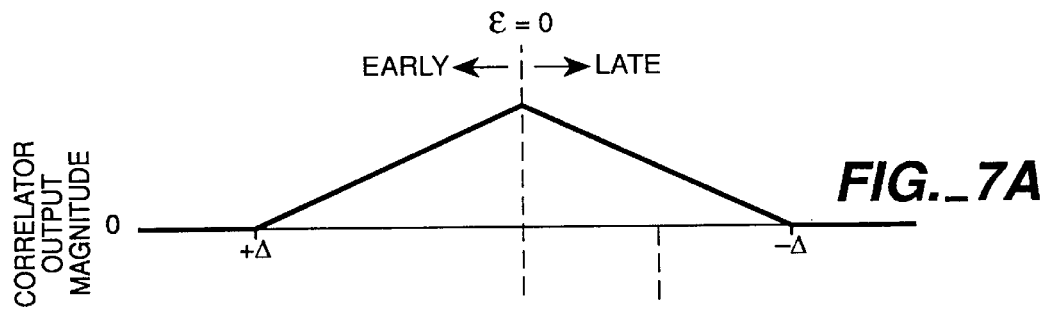
FIG._7A
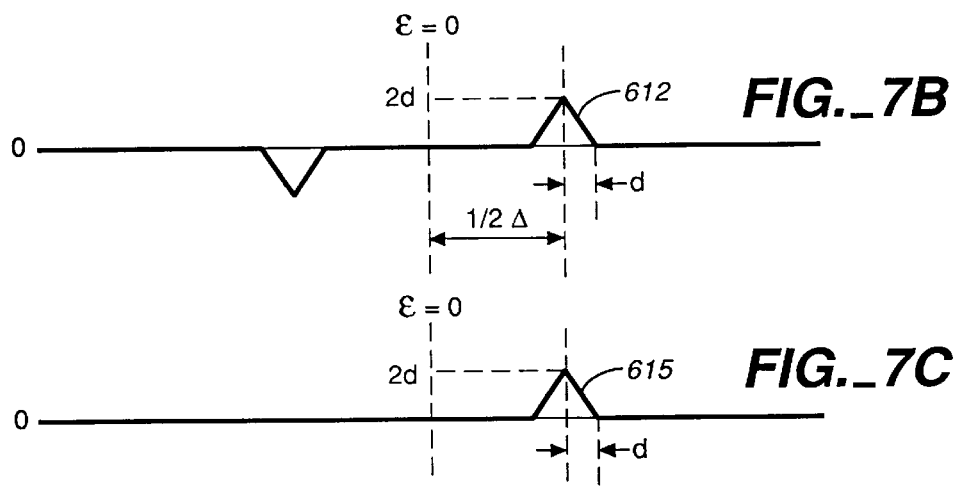
FIG._7B
FIG._7C
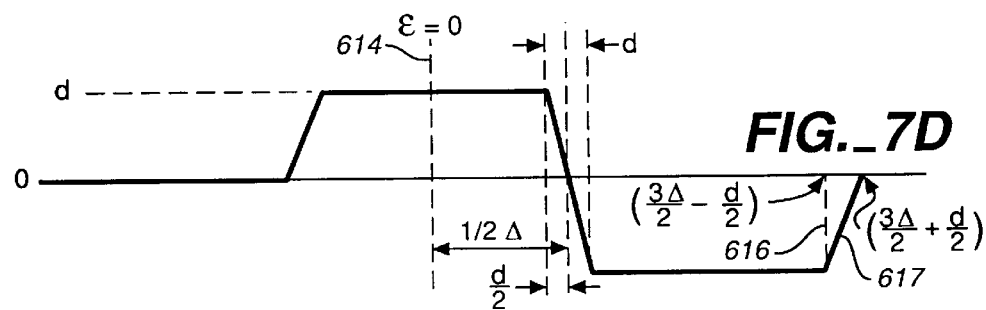
FIG._7D
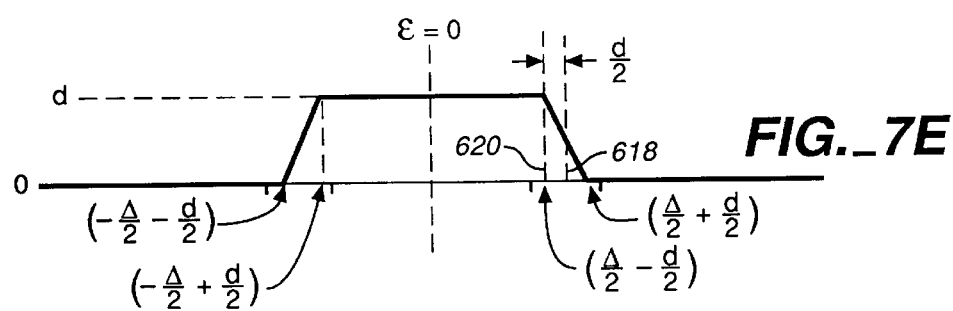
FIG._7E

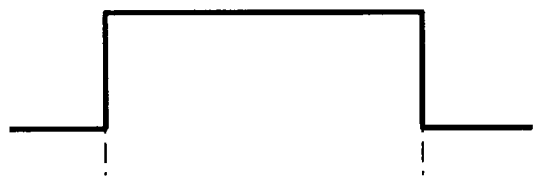
FIG._8A
FIG._8B
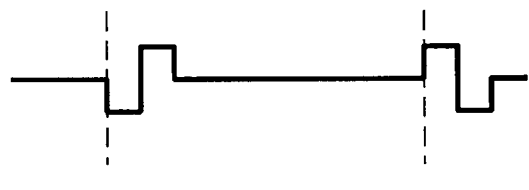
FIG._8C
FIG._8D
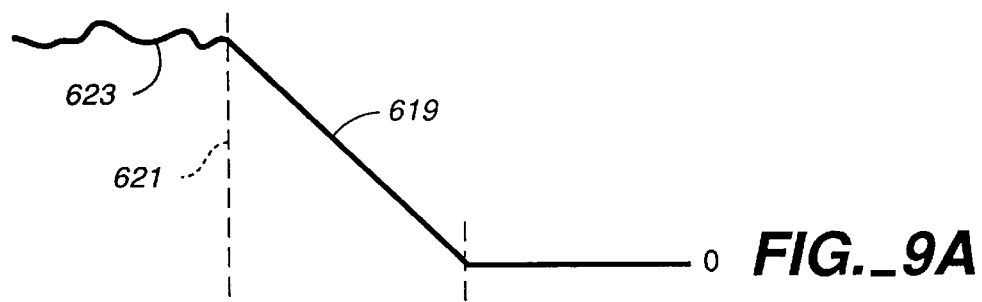
FIG._9A
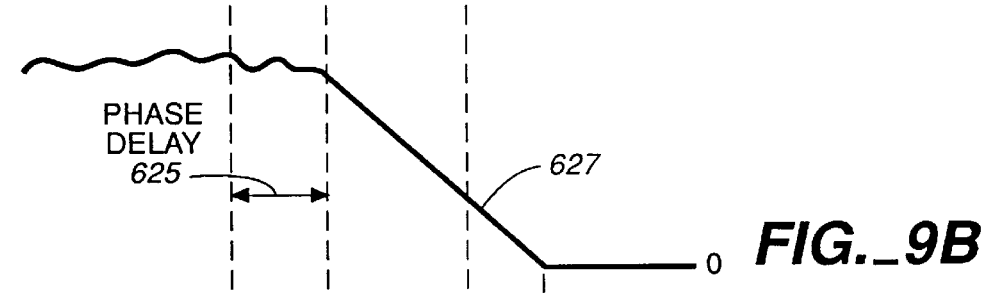
FIG._9B
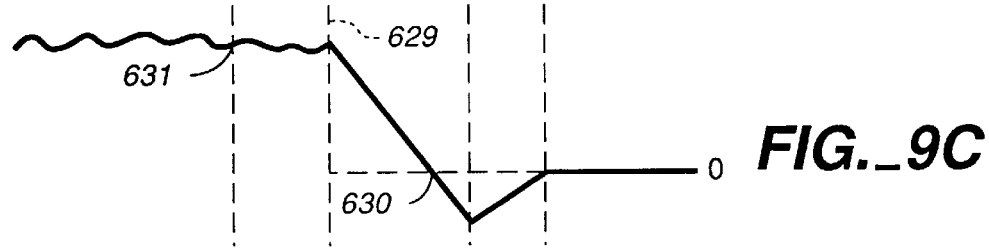
FIG._9C

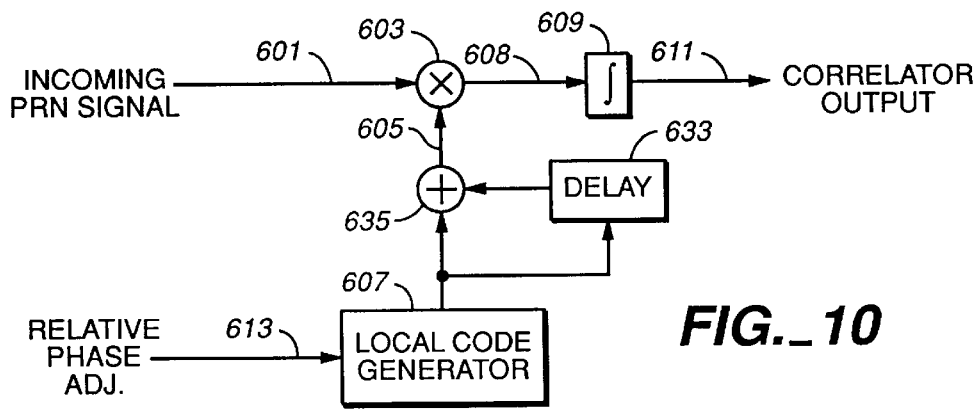
FIG._10
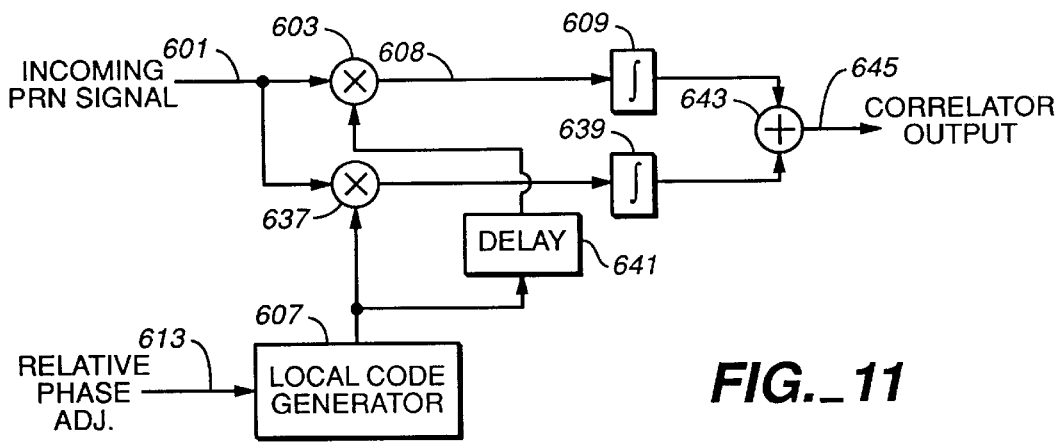
FIG._11
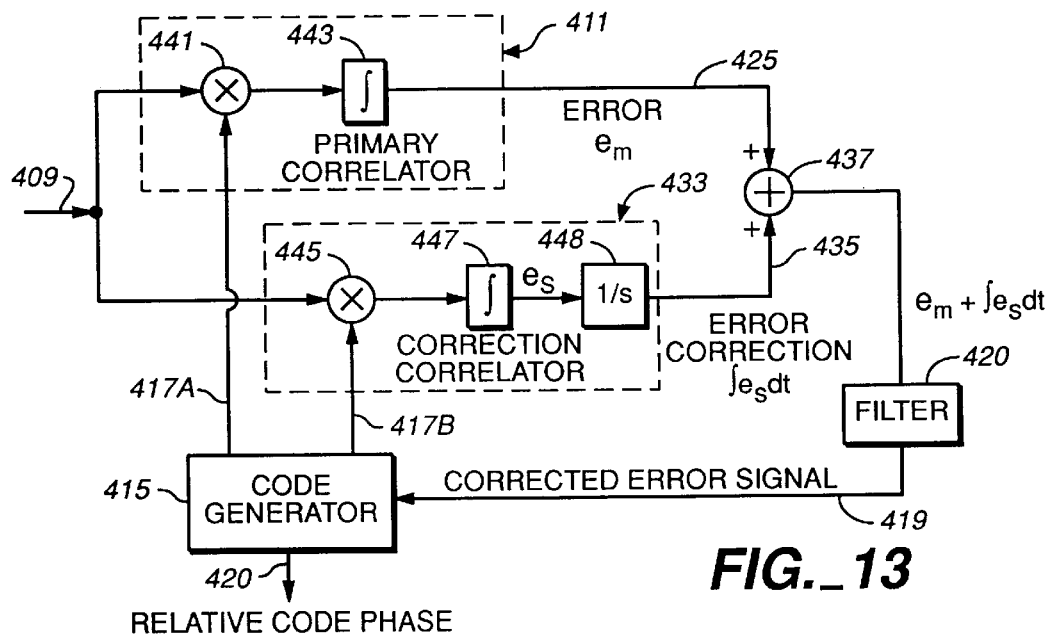
FIG._13

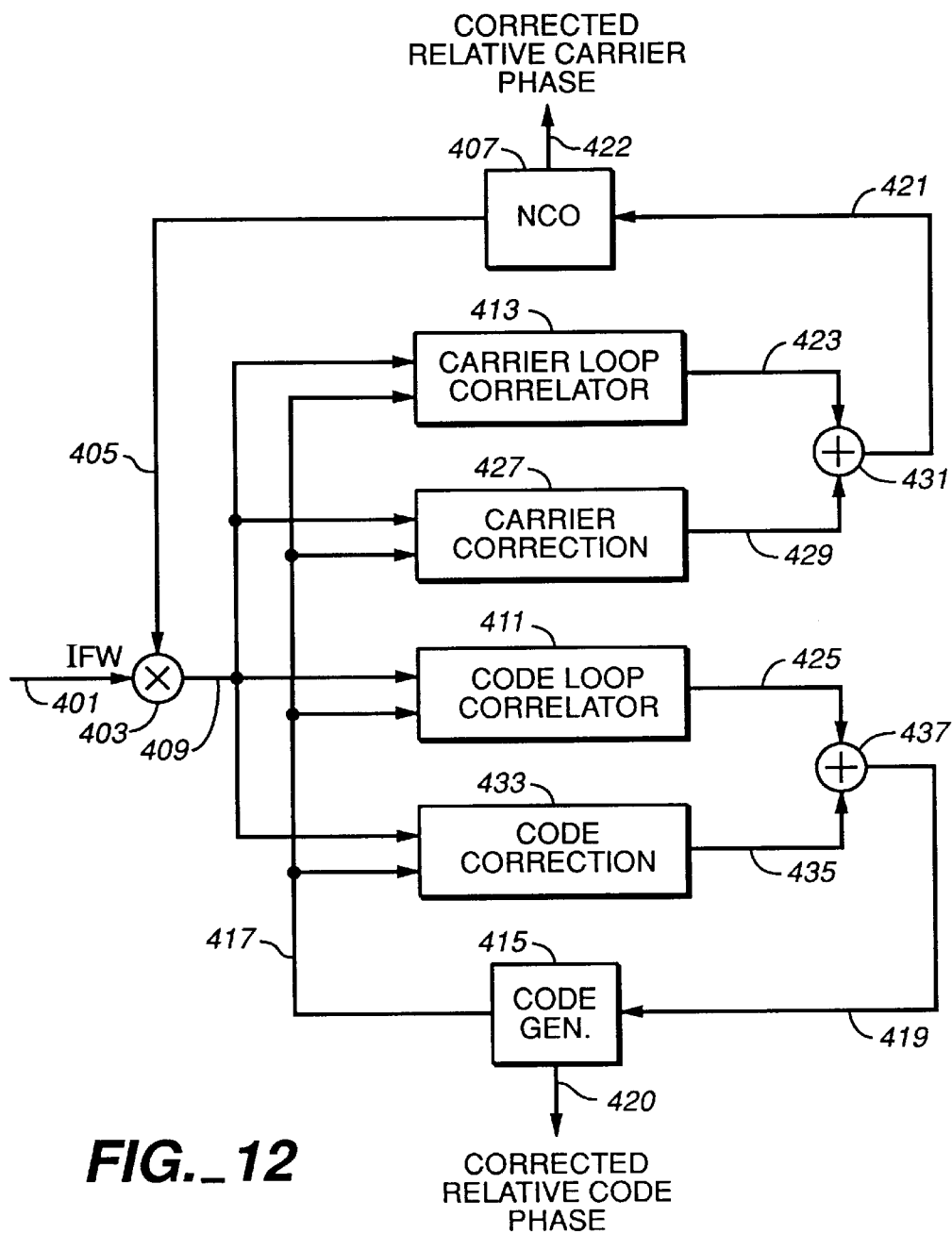
FIG._12

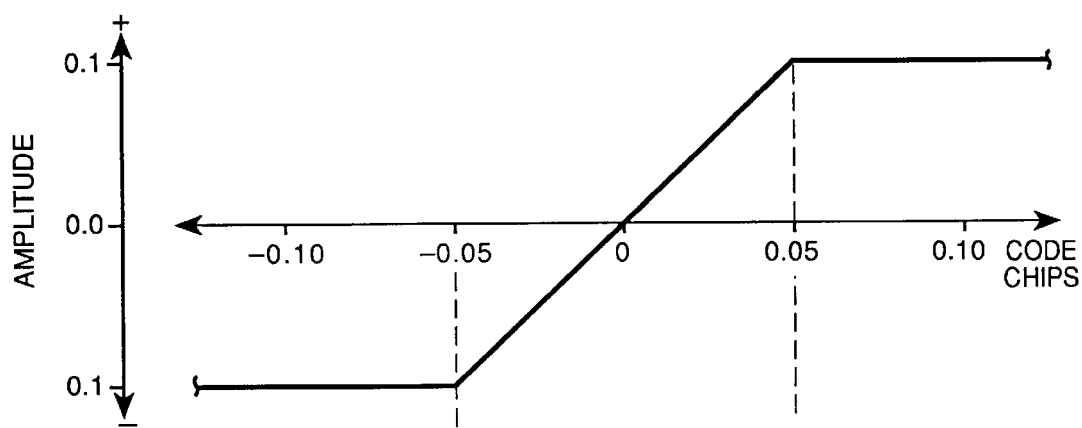
FIG._14A
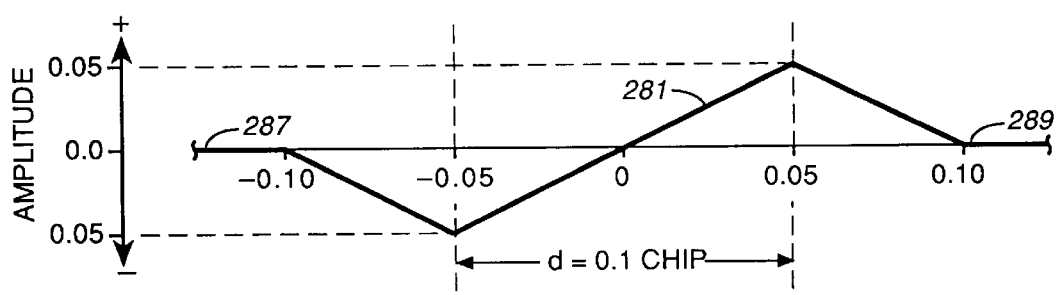
FIG._14B
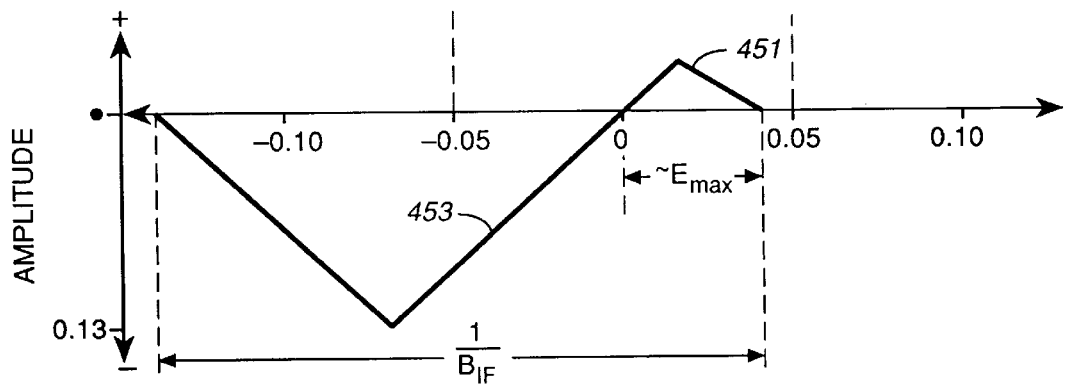
FIG._14C

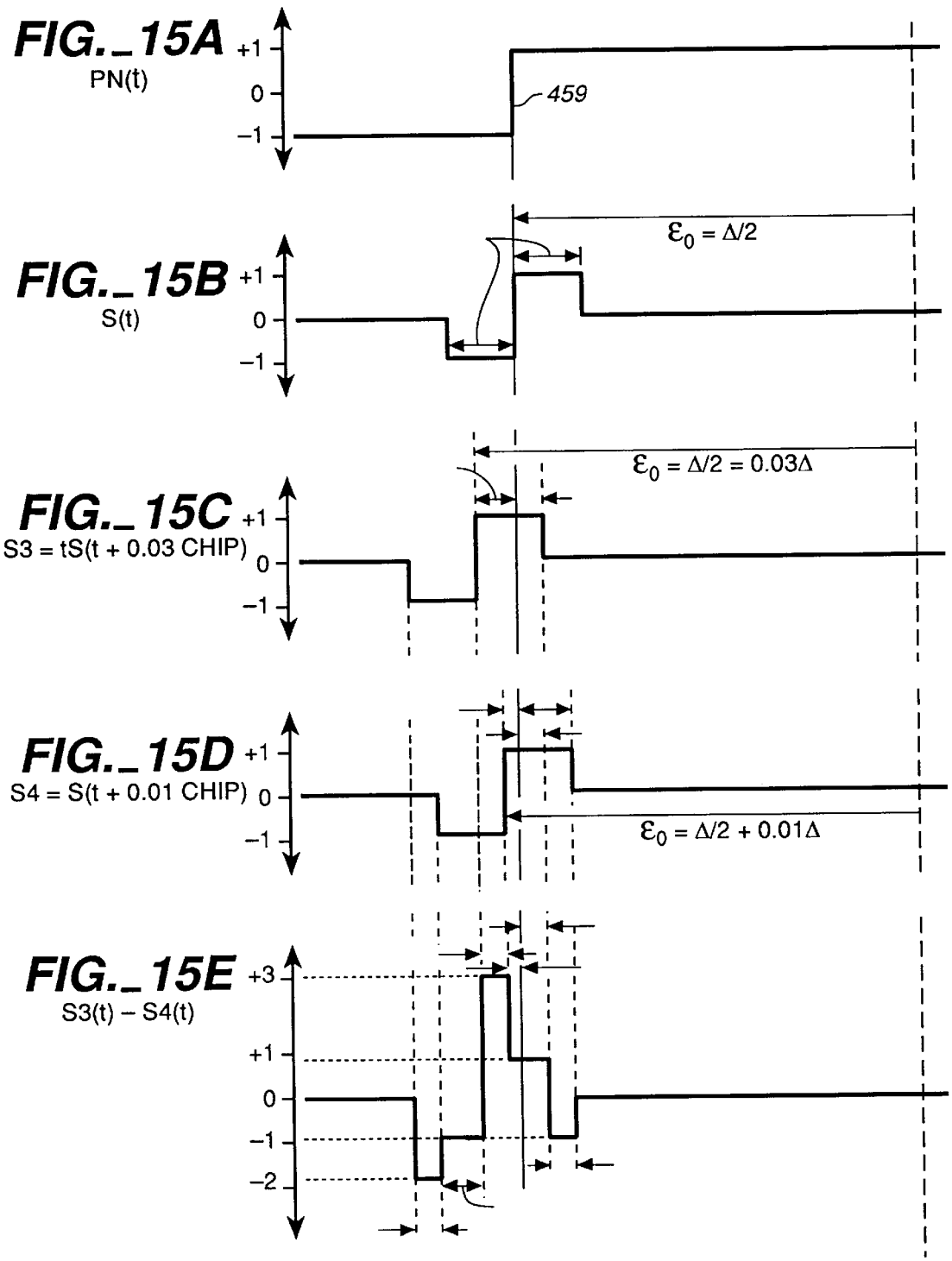

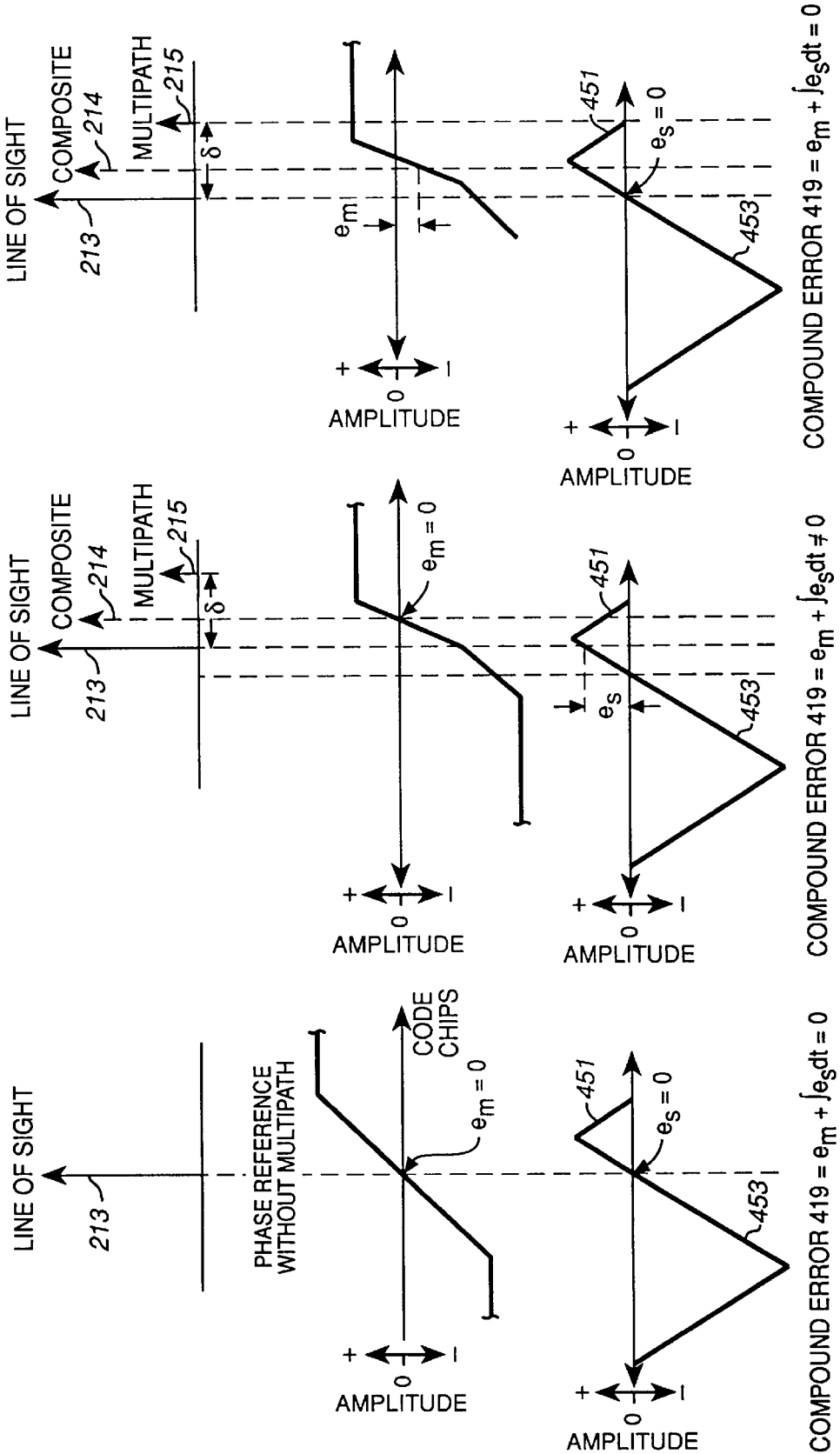
FIG._16A  FIG._16B  FIG._16C

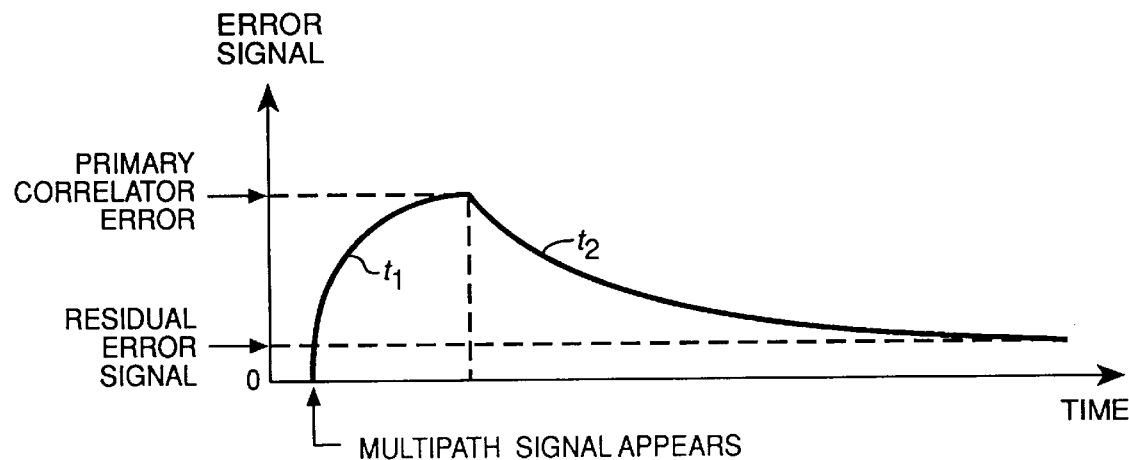
FIG._17
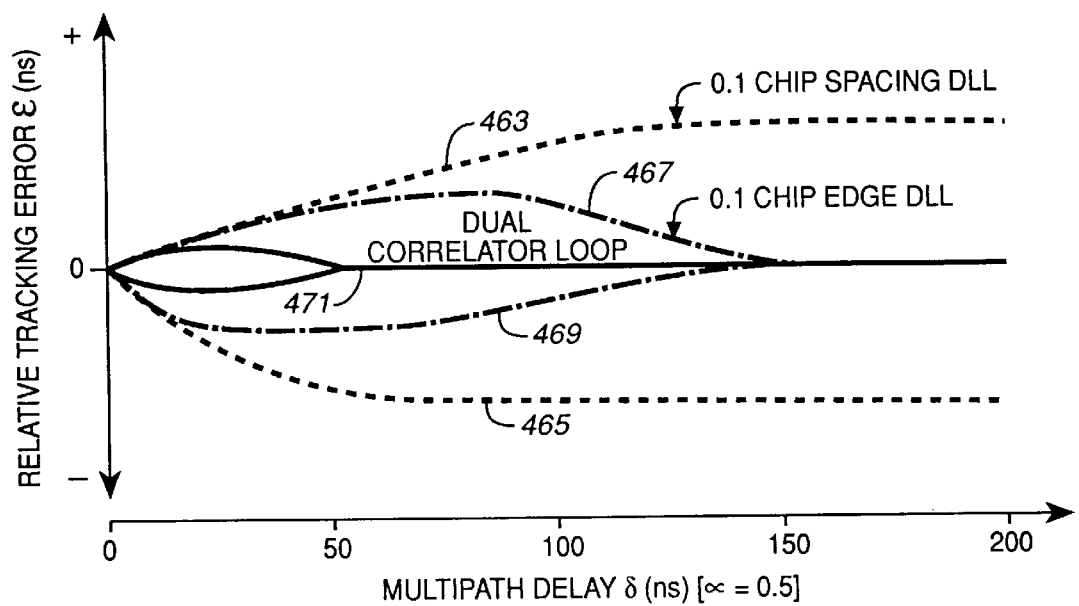
FIG._18

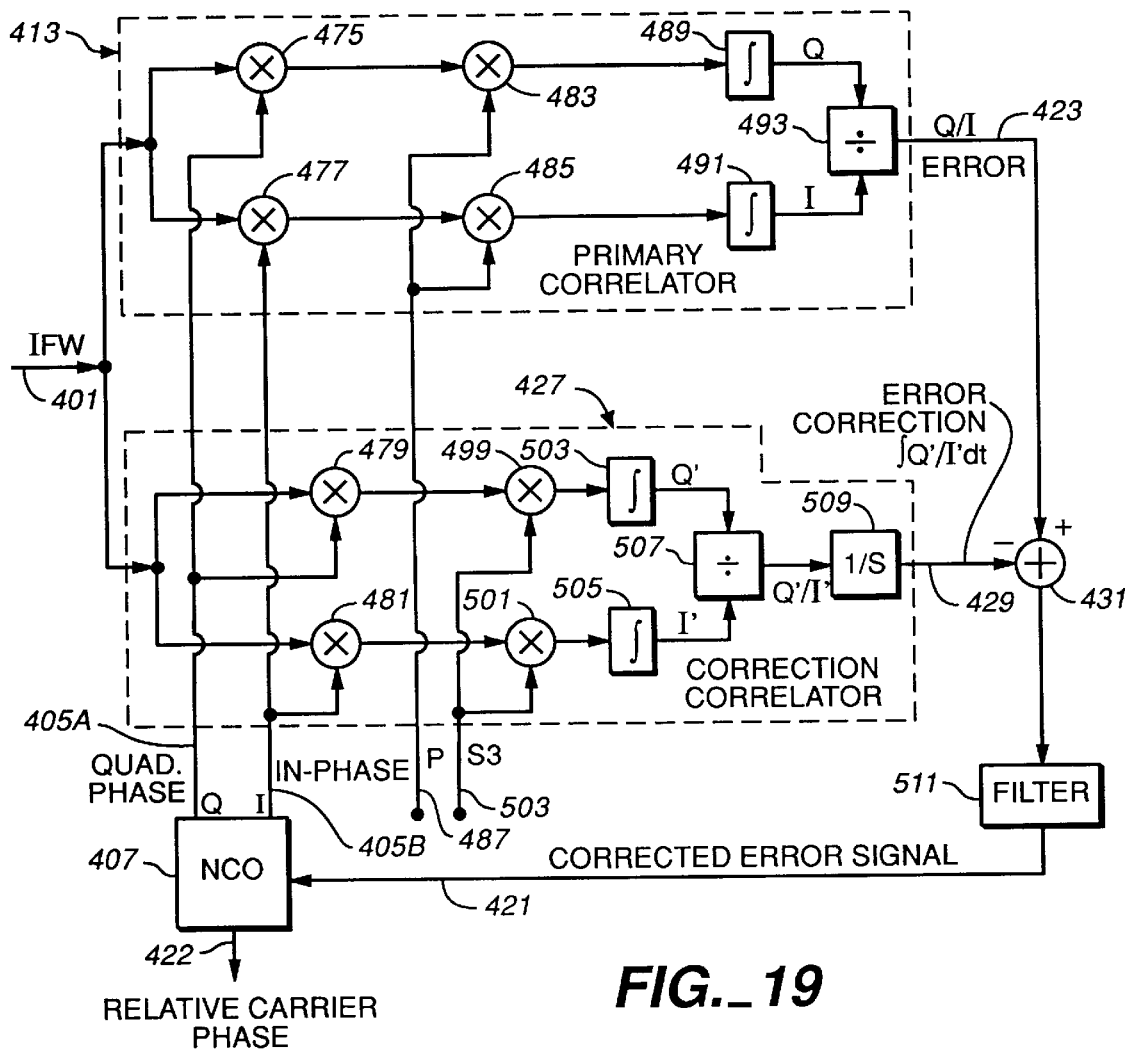
FIG._19
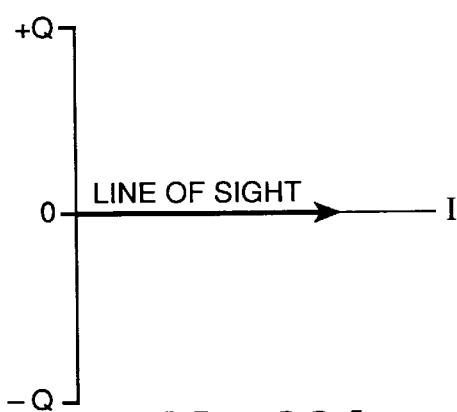
FIG._20A
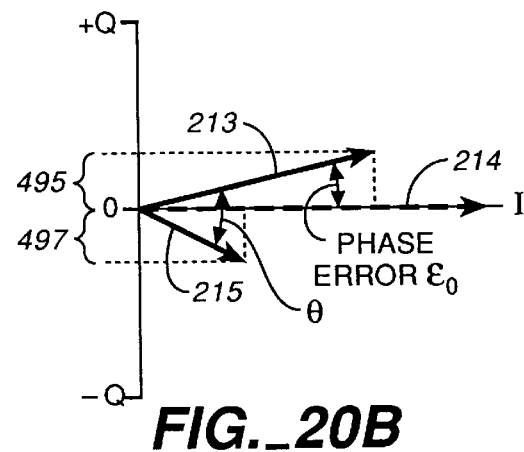
FIG._20B

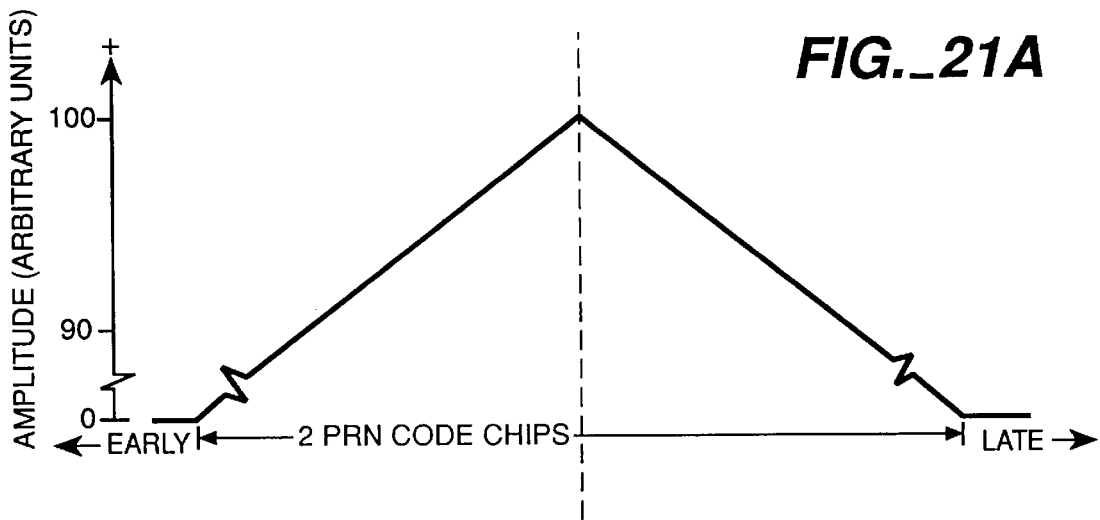
FIG._21A
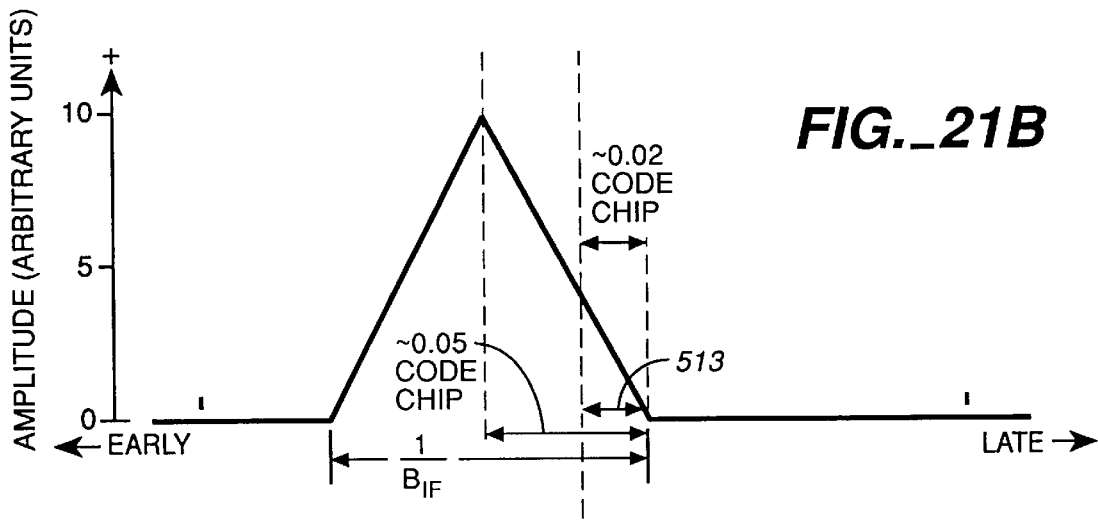
FIG._21B
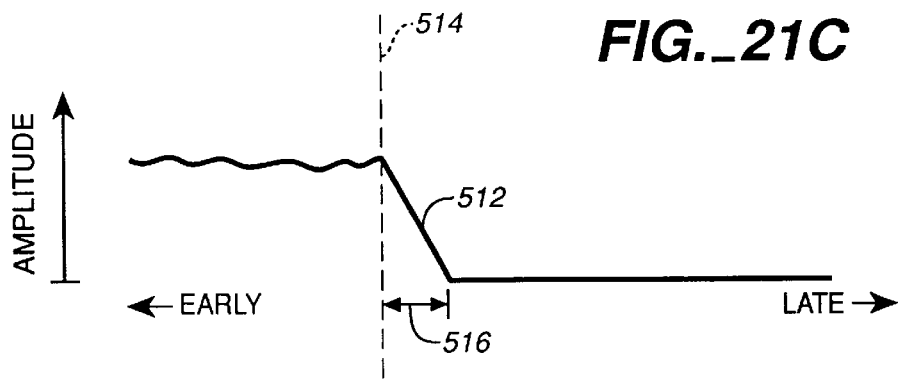
FIG._21C

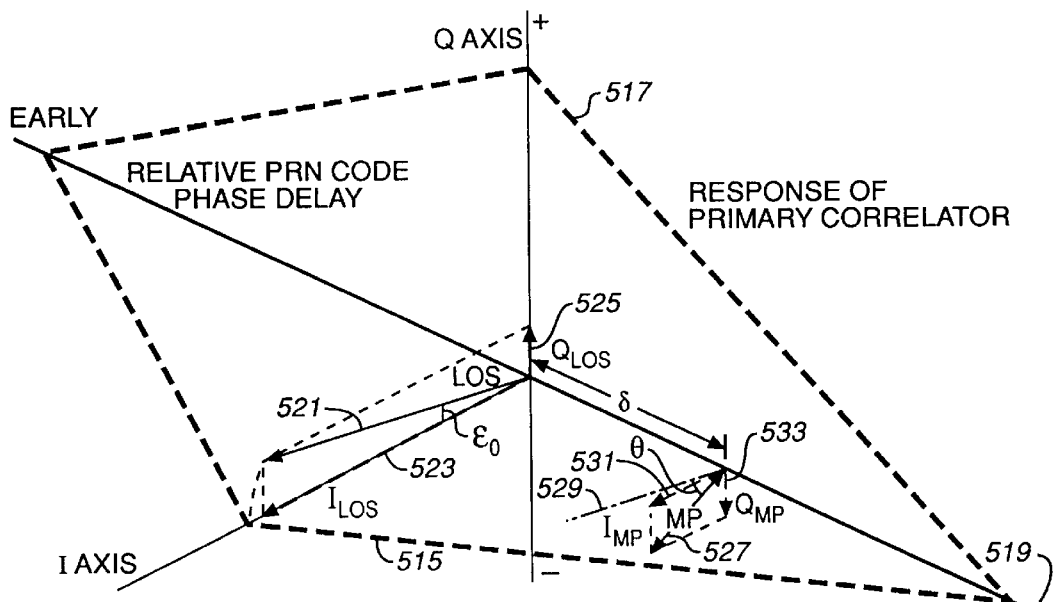
FIG._22
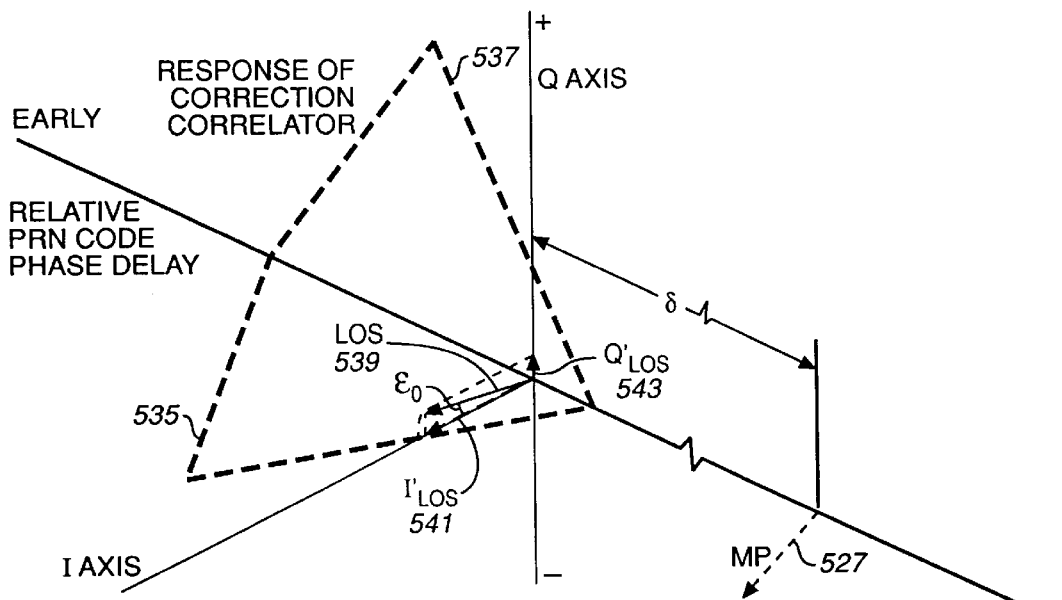
FIG._23

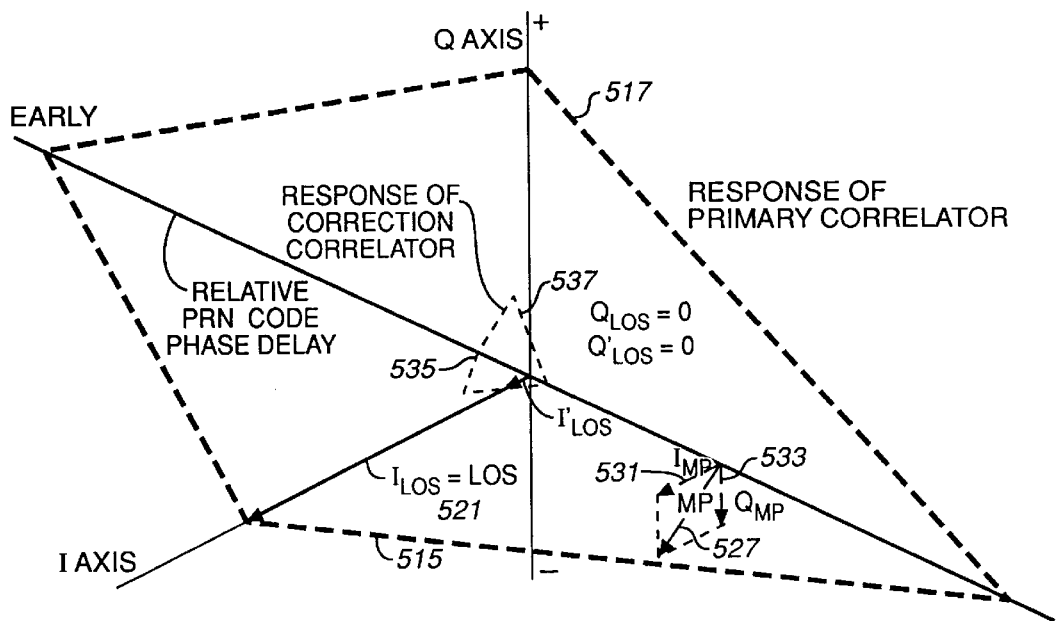
FIG._24
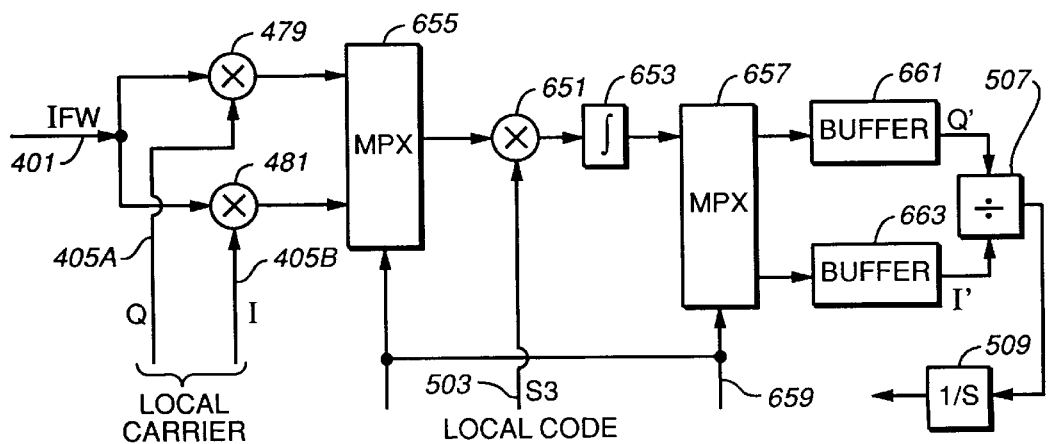
FIG._25

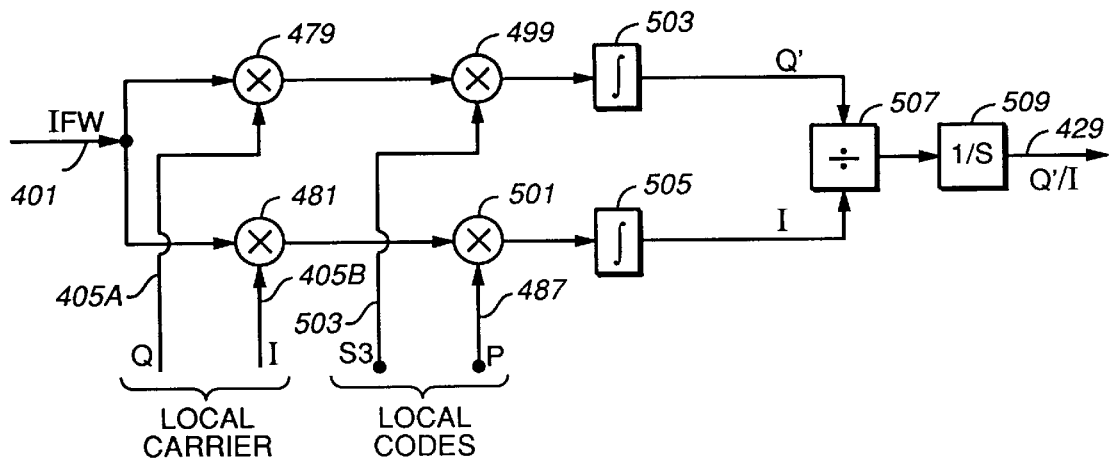
FIG._26
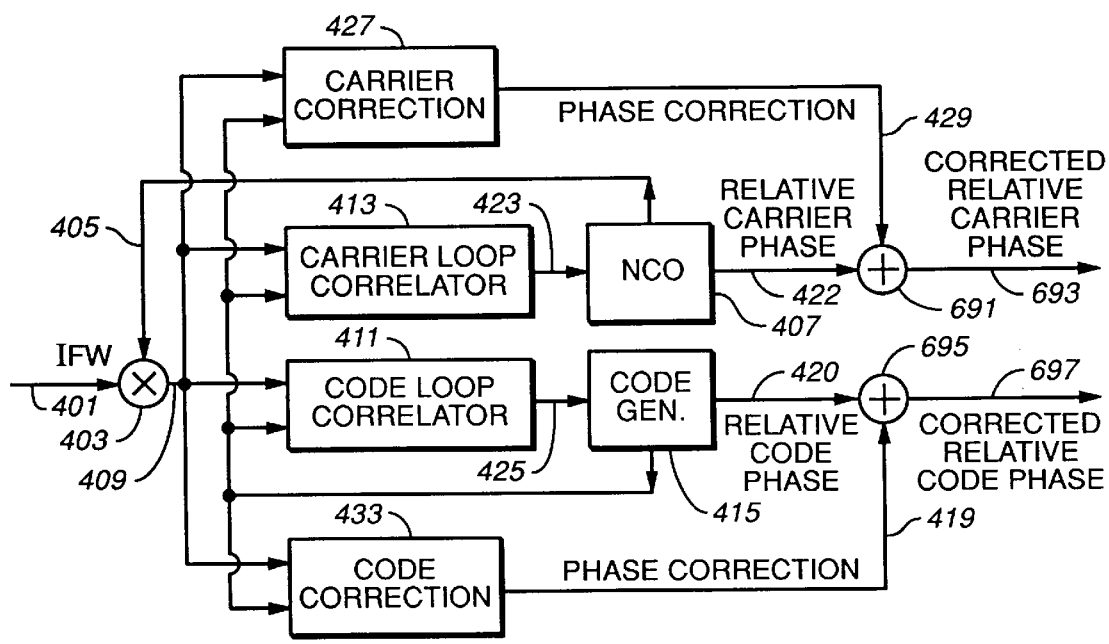
FIG._29

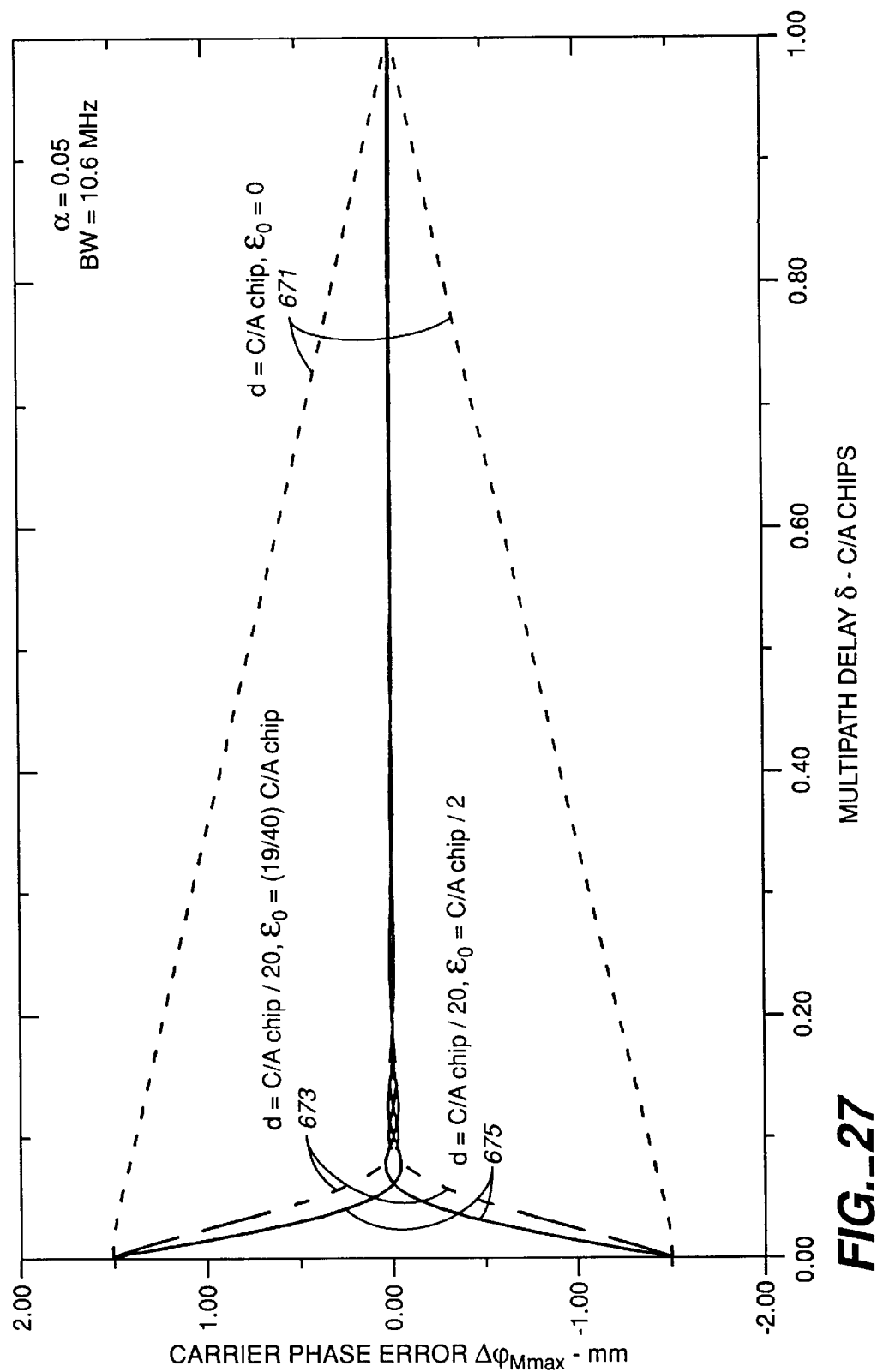
FIG._27

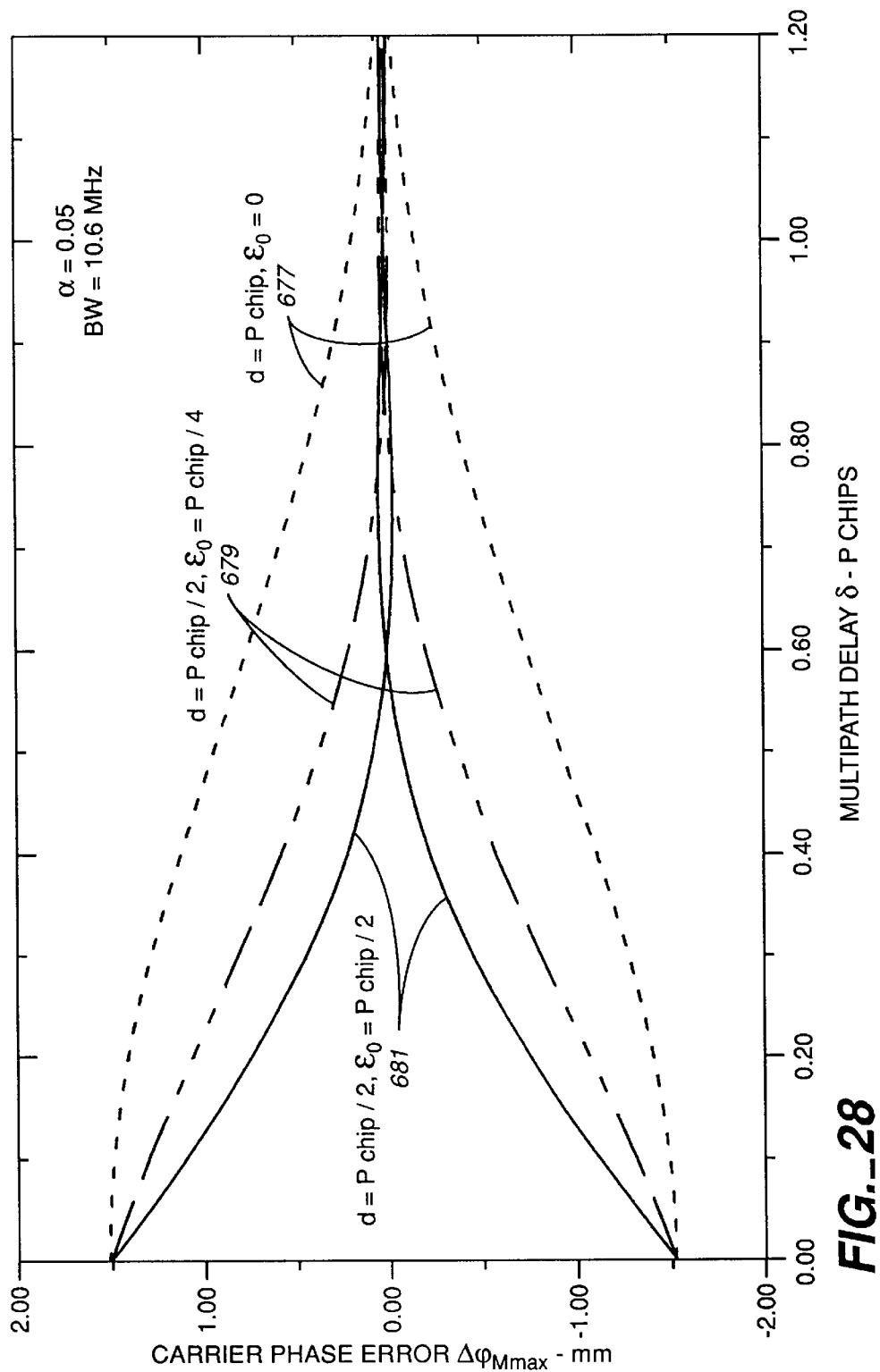
FIG._28

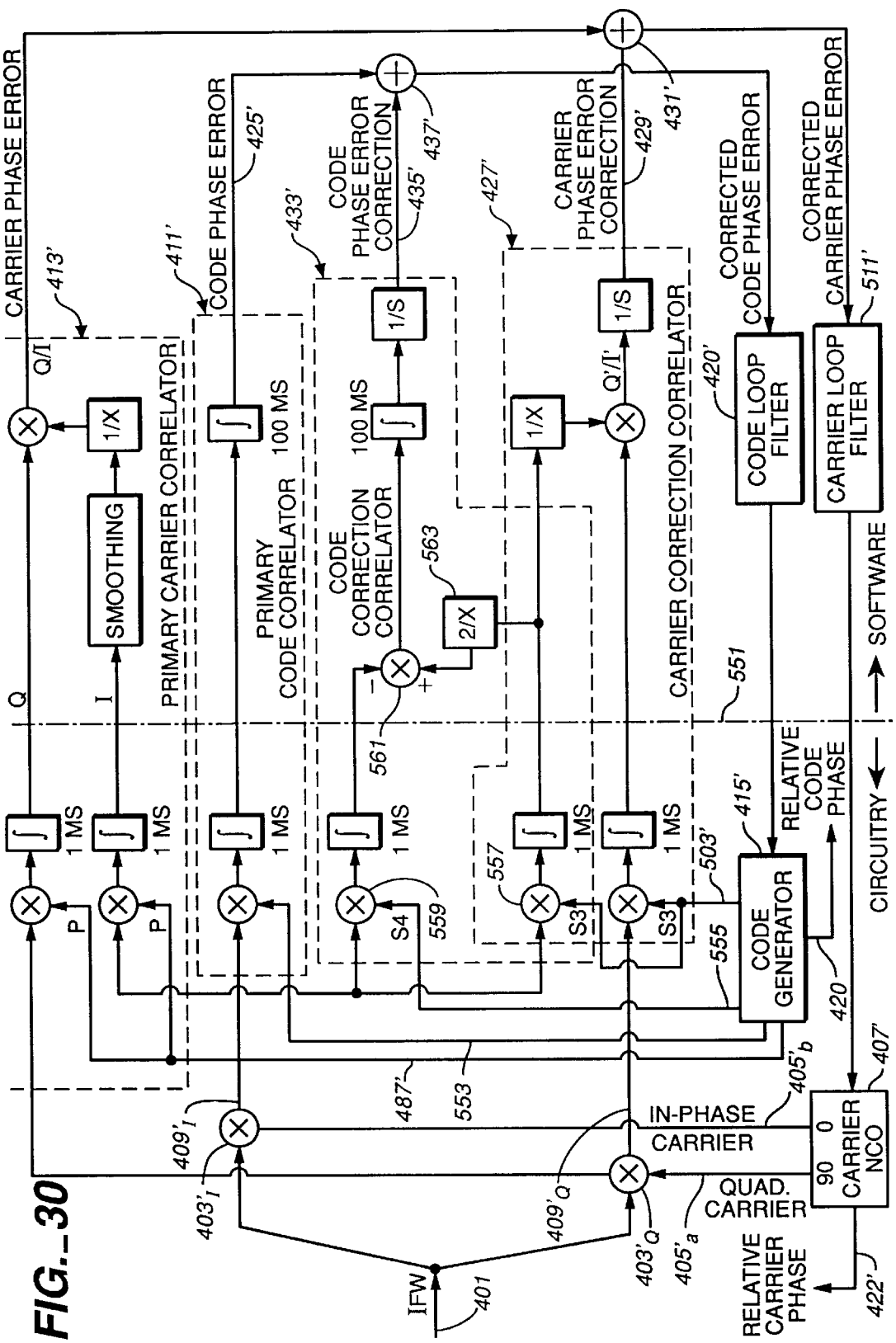
FIG._30

SIGNAL CORRELATION TECHNIQUE FOR A RECEIVER OF A SPREAD SPECTRUM SIGNAL INCLUDING A PSEUDO-RANDOM NOISE CODE THAT REDUCES ERRORS WHEN A MULTIPATH SIGNAL IS PRESENT

CROSS-REFERENCE TO RELATED APPLICATION

This is related to copending application by Zhodzicshsky et al., entitled "A Spread Spectrum Receiver Using a Pseudo-Random Noise Code for Ranging Applications In a Way That Reduces Errors When a Multipath Signal is Present," Ser. No. 08/512,822, filed Aug. 9, 1995, (hereinafter the "Prior Application"), which application is incorporated herein by this reference. To the extent that the same elements are disclosed herein as in this prior application, they are illustrated in the drawings with the same reference numbers.

BACKGROUND OF THE INVENTION

This invention relates to digital radio receivers which are used for navigation systems and other ranging applications, wherein the received signals are encoded with a pseudo-random noise (PRN) type code. This invention deals specially with environments where the multipath fading is severe.

The United States government has placed into orbit a number of satellites as part of a global positioning system (GPS). A GPS receiver receives signals from several such satellites and can determine very accurate parameters, such as position, velocity, and time. There are both military and commercial uses. A primary military use is for a receiver in an aircraft or ship to constantly determine the position and velocity of the plane or ship. An example of a commercial use includes surveying and the accurate determination of the location of a fixed point or a distance between two fixed points, with a high degree of accuracy. Another example is the generation of a high accuracy timing reference.

In order to accomplish this, each satellite continually transmits two L-band signals. A receiver simultaneously detects the signals from several satellites and processes them to extract information from the signals in order to calculate the desired parameters, such as position, velocity or time. The United States government has adopted standards for these satellite transmissions so that others may utilize the satellite signals by building receivers for specific purposes. The satellite transmission standards are set forth in detail by an "Interface Control Document" of Rockwell International Corporation, entitled "Navstar GPS Space Segment/Navigation User Interfaces", dated Sep. 26, 1984, as revised Dec. 19, 1986.

Briefly, each satellite transmits an L1 signal on a 1575.42 Mhz carrier, usually expressed as 1540 $f_0$, where $f_0$=1.023 Mhz. A second, L2 signal transmitted by each satellite, has a carrier frequency of 1227.6 Mhz, or 1200 $f_0$. Each of these signals is modulated in the satellite by at least one pseudo-random signal function that is unique to that satellite. This results in developing a spread spectrum signal that resists radio frequency noise or intentional jamming. It also allows the L-band signals from a number of satellites to be individually identified and separated in a receiver. One such pseudo-random function is a precision code ("P-code") that modulates both of the L1 and L2 carriers in the satellite. The P-code has a 10.23 Mhz clock rate and thus causes the L1 and L2 signals to have a 20.46 Mhz bandwidth. The length of the code is seven days; that is, the P-code pattern is begun again every seven days. In addition, the L1 signal of each satellite is modulated by a second pseudo-random function, or a unique clear acquisition code ("C/A code"), having a 1.023 Mhz clock rate and repeating its pattern every one millisecond, thus containing 1023 bits. Further, the L1 carrier is also modulated by a 50 bit-per-second navigational data stream that provides certain information of satellite identification, status and the like.

In a receiver, in the process of demodulating those satellite signals, signals corresponding to the known pseudo-random functions are generated and aligned in phase with those modulated onto the satellite signals. The phase of the carriers from each satellite being tracked is measured from the results of correlating each satellite signal with a locally generated pseudo-random function. The relative phase of carrier signals from a number of satellites is a measurement that is used by a receiver to calculate the desired end quantities of distance, velocity, time, etc. Since the P-code encrypted functions (Y-code) are to be classified by the United States government so that they can be used for military purposes only, commercial users of the GPS must work directly only with the C/A code pseudo-random function.

The government of the former USSR has placed into orbit a similar satellite positioning system called GLONASS; more information on its standard can be found in the "Global Satellite Navigation System GLONASS-Interface Control Document" of the RTCA Paper No. 518-91/SC159-317, approved by the Glavkosmos Institute of Space Device Engineering, the official former USSR GLONASS responsible organization. Although the present invention is described herein for use with the United States GPS system, it can be applied to a receiver designed to acquire the GLONASS signals or any radio frequency system using pseudo-random noise sequences for ranging.

One of the major factors influencing the final accuracy of a distance, velocity, etc., measurement being made is the accuracy with which the signal phase measurements are made. In turn, this phase measurement precision is altered if, in addition to the direct line-of-sight propagation signal, a multipath fading signal is also received. The phase of the C/A code, for example, is determined by use of a delay locked loop (DLL) correlator, wherein the phase of the internally generated C/A PRN code sequence is adjusted in a control loop to minimize an error signal. The DLL uses early and late versions of the internally generated code in a signal correlator that is part of it. Many such receivers use a time spacing between the early and late versions of one PRN code chip. (A "chip" is the time during which the code remains at a plus or minus one.) Operation of the DLL within such receivers is affected by any multipath signal present, thus causing a tracking error. The phase locked condition of the DLL is not only controlled by the line-of-sight signal, as is desired in order to eliminate a cause of phase measurement errors, but is also affected by the multipath signals as well.

Errors caused by multipath distortion in the out-of-phase condition can be reduced by narrowing the delay spacing between the early and late correlators in the DLL. Although this technique reduces the effect of the received multipath signals somewhat by reducing the loop gain to the weaker multipath signals, inaccuracies still result. It has not been found to be possible to completely eliminate the tracking error by simply narrowing the early-late delay spacing.

The Prior Application identified above describes use of a correlator having a zero loop gain over a majority of a range of relative phase difference between the locally generated PRN code and that encoded in the radio frequency signal being received from a satellite or other source, while, at the same time, providing a finite magnitude of loop gain in an operating phase difference region positioned about a zero phase difference. This significantly reduces, and even, in some cases, eliminates phase measurement errors that result when one or more multipath versions of a PRN encoded signal are present. However, as the desired level of measurement precision has increased, a phase measurement accuracy even greater than that provided by the techniques described in the Prior Application has been sought.

Therefore, it is a primary and general object of the present invention to provide a receiver signal processing technique that substantially eliminates phase measurement errors resulting from the presence of one or more multipath signals being received along with the desired line-of-sight signal.

SUMMARY OF THE INVENTION

This and additional objects of the present invention are realized, briefly and generally, by maintaining the characteristics of one or both of the carrier and code correlator loops that are best for tracking the signal and then independently measuring the amount of error occurring in the correlator loop on account of the presence of any multipath signal. The measured error is then used to correct for an erroneous measurement of signal phase being made by the correlator loop. This approach is quite different from adjusting the characteristics of the correlator loop itself in order to reduce the effects of a multipath signal. By use of the present invention, the correlator loop is not compromised in its operation while, at the same time, the effects of the multipath signal on phase measurement are significantly reduced or even eliminated. In one implementation, correction for the multipath signal is provided to the correlator loop directly so that it gives a measurement of the signal phase that is substantially, or even entirely, free of the effects of any multipath signal that is present. In another implementation, the measurement of the signal phase being made by the correlator loop, which will be erroneous when one or more multipath signals are present, is corrected with the independently measured error.

According to a more specific aspect of the present invention, the code loop is modified to be automatically corrected. A compound correlator loop is substituted for the single code loop now utilized for ranging applications in spread spectrum receivers. The compound correlator loop is formed of a primary correlator and a secondary correlator that senses and corrects for a tracking error of the primary correlator caused by any multipath signal. This allows the primary correlator to be provided with a response that defines the desired dynamic behavior of the compound loop while the second correlator is rendered essentially insensitive to the multipath signal. These two characteristics, difficult to implement in a single correlator, are carried out by separate correlators that work together. The second correlator need not participate directly in tracking, which the primary correlator does, but rather the second correlator senses the tracking point error of the primary correlator due to the presence of a multipath signal. That sensed error is then used to correct the primary correlator tracking point to substantially eliminate the effect of a multipath signal.

Since the second correlator need not participate directly in tracking, its characteristics can be optimized for the much different function of sensing the tracking error of the primary correlator. Similarly, since the characteristics of the primary correlator need not be compromised in order to deal with the presence of a multipath signal, it can be optimized for its tracking function. This results in more precise signal tracking, which in turn allows a more accurate range measurement to be made.

In a preferred embodiment, the second correlator has a very short non-zero late response. The second correlator characteristics will generally be asymmetrical; namely, have a much shorter non-zero late response than a non-zero early response. This allows the bandwidth of the second correlator to be adequate but its portion that can respond to a delayed multipath signal is made extremely short. This non-zero late response is made sufficiently long to handle the extent of tracking error of the primary correlator but no more than is necessary to do so. Any resulting degradation of the signal-to-noise ratio of the second correlator is made up through filtering by integrating its output for a time.

A primary focus of the present invention is on better multipath insensitivity, which often will be obtained in the second correlator with a resulting phase noise measurement degradation. This degradation, in turn, is compensated by decreasing the bandwidth of the second correlator loop. This loop bandwidth decrease is of no consequence on tracking performance of the compound loop, however, since its tracking performance remains dependent only upon the primary correlator.

The multipath correction techniques of the present invention have a particular application as both the code and the carrier tracking loops in each digital processing channel of a GPS or GLONASS receiver. They are an improvement over the single correlator code loop described in the Prior Application by providing even greater immunity to the presence of a multipath signal. It remains preferred to implement the correlators by using specific gating signals in combination with an accumulator/integrator, rather than using early-late versions of the locally generated PRN code. The gating signal generated for the second correlator is necessarily rather complex in order to obtain a preferred late response.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIG. 1 illustrates line-of-sight and multipath signals being received simultaneously by a GPS receiver;

FIGS. 2 and 3 show the line-of-sight and multipath signals in vector form;

FIG. 4 is a block diagram of a complete receiver embodying the various aspects of the present invention;

FIG. 5 is a schematic representation of a correlator of the type used in GPS receivers;

FIG. 6A shows an example of an incoming PRN signal that is input to the correlator of FIG. 5, and FIG. 6B shows a locally generated replica of that incoming signal;

FIGS. 6C–F illustrate various gating waveforms that may alternatively be used with the correlator of FIG. 5;

FIGS. 7A–E show alternative response characteristics of the correlator of FIG. 5 that are obtained with use of the respective gating signals of FIGS. 6B–F;

FIGS. 8A–C illustrate the formation of the gating signal of FIG. 8D from the gating signals of either of FIGS. 6C or 6D;

FIGS. 9A and 9B illustrate the formation of a correlator response shown in FIG. 9C;

FIG. 10 shows a modified version of the correlator of FIG. 5;

FIG. 11 shows yet another modified version of the correlator of FIG. 5;

FIG. 12 illustrates the carrier and code correlator loops of each of the digital processing channels of the receiver of FIG. 4;

FIG. 13 is a more detailed illustration of the composite code correlator loop of FIG. 12 for each of the channels of the receiver of FIG. 4;

FIGS. 14A, 14B and 14C are curves which show the response characteristics of the primary and correction code correlators of FIG. 13;

FIGS. 15A–E illustrate the formation of a gating signal of FIG. 14C;

FIGS. 16A–C are waveforms that illustrate operation of the composite code correlator loop of FIG. 13;

FIG. 17 is another curve that illustrates operation of the composite code correlator loop of FIG. 13;

FIG. 18 illustrates the results obtained with the composite code correlator loop of FIG. 13 relative to those of prior non-corrected loops;

FIG. 19 is a more detailed illustration of the composite carrier correlator loop of FIG. 12 for each of the channels of the receiver of FIG. 4;

FIGS. 20A and 20B show vectors that illustrate the effect of the presence of a multipath signal;

FIGS. 21A–C are curves which show the response characteristics of the primary and correction carrier correlators of FIG. 19;

FIGS. 22, 23 and 24 are three-dimensional vector diagrams that illustrate operation of the composite carrier correlator loop of FIG. 19;

FIG. 25 shows an alternative implementation of the correction correlator of FIG. 19;

FIG. 26 shows yet another alternative implementation of the correction correlator of FIG. 19;

FIGS. 27 and 28 illustrate the results obtained with the composite carrier correlator loop of FIG. 19 relative to those of prior non-corrected loops;

FIG. 29 shows a carrier correlator loop having open loop correction, as an alternative to that of FIG. 19; and FIG. 30 is a block diagram of a circuit and software implementation of the individual channel correlator of FIG. 12.

DESCRIPTION OF THE PREFERRED EMBODIMENTS

Referring to FIG. 1, the various aspects of the present invention are described with respect to a global positioning system ("GPS"). A GPS receiver 10 includes an antenna 11 which is positioned to receive a signal 205 from a satellite 207. In addition to the desired line-of-sight ("LOS") signal 205 received directly from the satellite 207, the antenna 11 also receives a second version of that signal, a delayed multipath signal 209. The multipath signal is delayed by δ because it reaches the antenna 11 by traversing a longer distance than does the line-of-sight signal 205. The multipath signal is shown in FIG. 1 to reflect off of a hill 211, or some other object. Although the present invention is explained simply with reference to a single multipath signal, there can be several delayed versions of the line-of-sight signal which are also received by the antenna 11 at the same time. Since GPS receivers, and other ranging receivers used in other applications, operate by measuring the phase of the received signal, a multipath signal can complicate that task considerably.

Various attempts have been made in antenna design to limit the acceptance of reflected signals. This is difficult, however, because it is generally desired to have the antennas maintain a wide angle property in order to receive signals from several satellites at one time that are viewed with different azimuth and elevation angles. Attempts have also been made to position the antenna as high as possible, in order to minimize ground and building reflections, or to carefully position it to avoid receiving reflected signals. Although these techniques may be used in conjunction with the present invention, the present invention uses various signal processing techniques within the receiver itself to discriminate against the received multipath signals.

Referring to FIGS. 2 and 3, a vector 213 represents the received line-of-sight signal, while another vector 215 represents the received multipath signal. The multipath signal 215 arrives at the receiver antenna 11 with a code phase delay δ relative to the line-of-sight signal 213. The multipath signal 215 will also be received with some carrier phase angle θ relative to the line-of-sight signal 213. It is shown in these figures, the multipath signal generally has a lower magnitude than does the line of sight signal as illustrated by it smaller vector 215. A ratio of these magnitudes is noted herein by α. For simplicity of explanation herein, a single multipath signal is shown, but one or more additional reflected signals could also exist simultaneously.

The description herein of operating embodiments of a spread spectrum receiver is mainly oriented towards the United States' Global Positioning System (GPS). However it can also be applied to the Common Independent States' GLObal NAvigation Satellite System (GLONASS) as well, any ranging system using a PRN sequence, or to other types of systems with similar characteristics. This embodiment is described with one bit quantization. This choice, made for the sake of the simplicity of the description, does not preclude any other constraints on the quantization.

Referring to FIG. 4, a general block diagram is given of a pseudo-random noise (PRN) receiver 10 in which the various aspects of the present invention are implemented. The receiver 10 includes an antenna 11, a down converter 12, multiple channels 13a to 13n, an input/output interface 14, and a digital processor 15. The antenna 11 receives a composite signal RF, composed of signals from all satellites in the system that are directly in the line of sight of the antenna. The composite RF signal is fed to the down-converter 12 to provide a quantized and sampled intermediate frequency signal IFW, a system sampling clock Ft and a SYSTEM CLOCK.

Code Correlators and Their Gating Signals

A simple correlator is illustrated in FIG. 5 for the purpose of discussing its desired response characteristics and techniques for obtaining such characteristics by use of specific forms of gating signals. An incoming signal 601 contains a known PRN code sequence and is applied to a mixer 603. Also applied to the mixer 603 is a gating signal 605 that is generated by a local code generator 607. An output 608 of the correlator 603 is a mathematical product of the two inputs 601 and 605. The output 608 is then integrated by an accumulator 609 in order to improve the signal-to-noise ratio of the product, that integrated signal appearing at an output 611. The amplitude of the output 611 is a function of the relative phase between the incoming PRN code and the locally generated PRN code. That relative phase is controlled by a signal 613.

Correlators for GPS receivers and similar applications have traditionally correlated the incoming signal with early (advanced in phase) and late (delayed in phase) locally generated replicas of the PRN code contained in the incoming signal. As shown in FIG. 4 of the Prior Application, a difference between these two correlations becomes the output of the correlator. The correlator output characteristics are controlled by the difference in relative phase of the early and late code replicas that are used. More complicated correlators, such as shown in FIGS. 7 and 8 of the Prior Application, can be fashioned to provide a wide variety of correlator functions. However, as described in the Prior Application, it is preferred to use a simpler correlator, such as that shown in FIG. 5 herein, which operates from a single gating signal 605. It is then the characteristics of the gating signal 605 that controls the correlator output 611 as a function of relative gating signal phase 613.

FIGS. 6C through 6F show four examples of gating signals that are useful in implementations of the present invention. The curve of FIG. 6B gives an example PRN code that may be generated in the receiver as a replica of the PRN code of FIG. 6A that is contained in the incoming signal, although it need not actually be so generated in order to implement the present invention. It is shown as a reference. The reference code of FIG. 6B is shown to be in phase with that of FIG. 6A. The dotted portion of the signal of FIG. 6A is an idealized received code, and the solid curve shows a more typical PRN code that is received by the digital processing channel of a receiver after the received signal is necessarily limited in bandwidth by the down converter 12 (FIG. 4) and other front end portions of the receiver. For the purpose of describing the present invention, however, the idealized received code is assumed, for simplicity of explanation.

FIG. 6C shows several cycles of one example gating signal s(t). It will be noted that this signal goes from a negative level to a positive level when the local PRN reference signal of FIG. 6B is positive, and, conversely, from a positive level to a negative level when the PRN reference signal is negative. No gating signal occurs during the code chip period 460, since there was no PRN code transition at the previous chip boundary 461. The duration of each of the negative and positive going components of the gating signal is denoted as "d", which is some fraction of one chip, such as 0.05 C/A code chip. The relative phase between the gating signal of FIG. 6C and the reference PRN signal of FIG. 6B is denoted by $\epsilon_0$. The quantity $\epsilon_0$ is defined to extend between a center of the local PRN reference signal chip of FIG. 6B and the center of the related code pulse of FIG. 6C, as shown in the figures. As the relative phase quantity $\epsilon_0$ is varied, operation of the correlator of FIG. 5 moves to a different portion of its characteristic curve, as described later.

Another gating signal, shown in FIG. 6D, is the same as that of FIG. 6C, with an important difference. Within the code chip 460, where no transition of the reference PRN code of FIG. 6B exists at the chip boundary 461, a gating signal occurs anyway. In this case, this additional gating signal transitions from a high to low level because the magnitude of the locally generated code of FIG. 6B is low. The gating signals of both FIGS. 6C and 6D are bipolar.

Further example gating signals are shown in FIGS. 6E and 6F. These signals are both unipolar, those of FIG. 6E not occurring during the code period 460, while those of FIG. 6E do occur during the period 460. The polarity of each gating signal in the examples of FIG. 6E and 6F is the same as that of the reference code of FIG. 6B at the occurrence of the gating signal. Their durations are "d" long.

Of the four examples shown in FIGS. 6C–6F of the gating signal 605 (FIG. 5), that of FIG. 6E provides the correlator of FIG. 5 with the highest signal-to-noise ratio. Use of the signal of FIG. 6D is the worst in this respect, and those of FIGS. 6C and 6F are in between. A disadvantage in many applications of using one of the gating signals of FIGS. 6C or 6E is that the correlator has some response at plus and minus one chip, in addition to the response shown in FIG. 7C. Use of the one of the gating signals of FIGS. 6D or 6F will not give this added response. It has been found that the tradeoffs resulting from use of the gating signal of FIG. 6F is usually preferred.

It will be recognized that there are many different forms of gating signals 605 that can be devised to provide a desired response of the correlator of FIG. 5. only single level signals are shown in FIGS. 6C–6F. A signal having other combinations of magnitudes can be also be used, for example. The various gating signals being described may be generated by use of standard logic circuit techniques in the local code generator 607, or by use of a digital signal processor therein, or by a combination of both. As described hereinafter, a combination of some circuitry and software controlled processing is a preferred implementation.

Additional possibilities for more complex gating signals exist from the combination of those of FIGS. 6C–6F. FIGS. 8A–8D show the generation of a more complex gating function of FIG. 8D from either of the gating signals of FIG. 6C or 6D. Such a gating signal is shifted to its phase shown in FIG. 8B, relative to a reference code of FIG. 8A, and also to the relative phase shown in FIG. 8C. These two shifted signals are then subtracted in order to obtain a more complex gating signal of FIG. 8D. This gating signal will be recognized as that described with respect to FIG. 12 of the Prior Application.

Although this discussion has begun by describing examples of correlator gating signals, it is a particular correlator response characteristic that is the desired end result. The gating signals are important since they contribute to correlator response characteristics but are not the end in themselves. Each of FIGS. 7A–7E provides the characteristic response of the correlator of FIG. 5 when a respective one of the gating signals of FIGS. 6B–6F is used. Each of the FIGS. 7A–7E shows a magnitude (vertical axis) of the correlator output 611 as a function of the relative phase $\epsilon_0$ (horizontal axis) between its respective one of the gating signals of FIGS. 6C–6F and the reference code of FIG. 6B, over a range of plus one chip $\Delta$ (code leads the reference) to a minus one chip $\Delta$ (code trails the reference). The curve of FIG. 7B is a response when the gating signal of FIG. 6C is used, the response of FIG. 7C obtained with the gating signal of FIG. 6D, and so forth.

An important feature of each of the correlator responses of FIGS. 7A–7E is a short trailing late characteristic slope, such as a slope 615 of FIG. 7C and a slope 617 of FIG. 7D, that go to zero. Either positive or negative going slopes are useful. Such a correlator characteristic slope 619 is shown in FIG. 9A, with reference to a starting point 621. For the particular use in a correction correlator of the present invention, the shape of a portion 623 of the correlator response occurring earlier than the point 621 is immaterial. The same slope 627 is also generated with a fixed delay 625, as shown in FIG. 9B, to start at a point 629. The two characteristic slopes 619 and 627 are then combined to generate a desired characteristic shown in FIG. 9C.

That desired late correlator characteristic is a correlator response 630 that is zero, and then goes to a peak and back to zero in the shortest possible distance on the horizontal axis. The shape of the response portion 631 prior to the point 629 is immaterial. The reasons for the late characteristic being desirable for the correction correlator are discussed in a later section. A limit of how close the FIG. 9C zero crossings can be spaced is set by the limited bandwidth of the receiver front end sections. The late correlator response of FIG. 9C is ideal, assuming no bandwidth restrictions, but in an actual implementation, it will be smeared somewhat. Because of this non-perfect response, the zero crossings need to be spaced apart some distance that increases as the bandwidth of the receiver decreases.

In order to obtain the late correlator characteristic of FIG. 9C, a common slope is used in two forms, one slightly delayed from the other, and then they are combined with some scaling factor between them. The distance between the zero crossings is controlled by the phase delay 625. In a specific example, the slopes are combined by multiplying the characteristic slope 619 by two and then subtracting from that result the characteristic slope 627.

FIGS. 10 and 11 show modified versions of the correlator of FIG. 5 that can provide the correlator characteristics of FIG. 9C. In FIG. 10, the gating signal applied to the mixer 603 is a combination of that generated by the local code generator 607 when combined in an adder 635 with a scaled down version of that same gating signal that has been delayed by a delay circuit 633. Thus, this correlator can generate the gating signal of FIG. 9C and set the delay 633 to be the phase delay 625 in duration, in order to generate and use the gating signal of FIG. 9C in the correlator.

The correlator of FIG. 11 combines a second correlator of a mixer 637 and integrator 639 in parallel with the correlator having the mixer 603 and integrator 609. Both correlator portions receive the same incoming PRN signal and combine their outputs in at 643 to provide an overall correlator output 645. When configuring this correlator to have the late characteristic of FIG. 9C, the local code generator 607 can generate any of the gating signals of FIGS. 6C–6F, and a delay circuit 641 is set to delay that signal by the phase delay 625 of FIG. 9B. The gating signal is applied to the mixer 637 while the delayed version is applied to the mixer 603. The two correlator outputs, corresponding to those shown in FIGS. 9A and 9B are then scaled and combined in the circuit 643 in the manner described above. In general, the same correlator response can be obtained with the approach shown in either of FIGS. 10 or 11.

Digital Receiver Channel, Generally

Referring to FIG. 12, the structure and operation of each of multiple processing channels of the receiver of FIG. 4 is shown. One of similar channel circuits 13a–13n is provided for each of the satellites being simultaneously tracked by the receiver. In a preferred embodiment, a portion of the signal processing illustrated in FIG. 12 is implemented by circuits within one of the channels 13a–13n of the receiver of FIG. 4 and the remainder of the processing of FIG. 12 is implemented by software in the processor 15. The intermediate frequency signal IFW applied to each of these channels over circuits 401 is applied to a mixer 403. The mixer 403 also receives, in a circuit 405, a replica of the carrier contained in the intermediate frequency signal in the circuits 401. This carrier replica is generated by a numerically controlled oscillator (NCO) 407. A resulting signal in circuits 409 thus has the carrier removed. This demodulated signal is applied to both a primary correlator 411 as part of a primary code loop, and to primary correlator 413 as part of a primary carrier loop.

Each of these primary loops includes a DLL for code and a phase-lock-loop ("PLL") for the carrier, as commonly used in GPS receivers. An error signal in a circuit 421, part of the carrier loop, causes the NCO to shift the phase of the locally generated carrier in circuits 405 relative to that of the incoming signal in circuits 401. An output 422 is a signal proportional to the relative phase of the carrier being generated by the NCO 407, and is a quantity used by the receiver to measure a desired parameter such as distance. A local code generator 415 provides in circuits 417 a PRN code corresponding to the code which is a part of the signal carried by circuits 409. In the example of a GPS receiver, this code can be either the C/A code or the P-code. An error signal in a circuit 419, part of the code loop, causes the code generator 415 to adjust the phase of the local code relative to that of the incoming signal in circuits 401. An output 420 of the code generator 415 gives a signal related to the phase of the code being generated thereby, the quantity used by GPS and related types of receivers to measure position, distance, velocity, and similar quantities.

Normally, an output 423 of the carrier loop correlator 413 would provide the error signal directly to the NCO 407 through circuits 421. Similarly, an output 425 of the primary code loop correlator 411 would normally provide the error signal for the code generator 415 by connection directly with the circuits 419. However, according to the present invention, an additional carrier correction circuit 427 and/or additional code correction circuit 433 is provided. The carrier correction circuit 427 provides an output 429 that effectively biases the error signal in circuits 423 by combination with this error signal in an adder 431. Similarly, an output 435 of the code correction circuit 433 carries a bias signal that is combined in an adder 437 with the error signal in circuits 425. The carrier correction circuit 427 is preferably a correlator having a structure similar to that of the primary correlator 413 but with a much different response. Similarly, the correction correlator 433 in the code loop is similar in structure to the primary correlator 411 but with a much different response function.

As discussed below with respect to specific embodiments of each of the carrier and code loops, the response of the correction correlators 427 and 433 is made to sense the current tracking point error of each of the primary loops formed of their respective primary correlators 413 and 411. The response of these correction sub-loops is made to have a very low sensitivity to the multipath signal component of the incoming signal in circuits 401. The correction sub-loops do not directly participate in the carrier and code tracking functions. The primary loops utilizing the primary correlators 413 and 411 can then be chosen to have a response that provides necessary dynamic code tracking characteristics. That is, the response of the primary correlators in each of the carrier and code loops need not be compromised in order to minimize the effect of a multipath signal. Rather the response of the primary correlators 413 and 411 is chosen to provide the best loop response possible, as if a multipath signal was not present. The response of the correction correlators 427 and 433 is then made to be highly insensitive to the multipath signal in order to generate correction signals that are used to bias the error signals of the respective primary loops. The sometimes competing requirements of a high dynamic loop response and insensitivity to multipath signals are then uncoupled and treated by different portions of each of the compound carrier PLL and compound code DLL. This approach more completely compensates for the presence of a multipath signal than does prior approaches to the problem. And it is done without impacting on the dynamic behavior of the overall loop.

Code Compound DLL

FIGS. 13–18 illustrate various aspects of the structure and operation of the PRN code loop of FIG. 12. Referring initially to FIG. 13, the primary correlator 411 includes a mixer 441 that receives both the demodulated signal in circuits 409 and a locally generated PRN code in circuits 417a. An output of the mixer 441 is applied to an accumulator/integrator 443, whose output in the circuit 425 is an error signal that would normally be applied to the code generator 415 to adjust the relative phase of a locally generated gating signal in a circuit 417a, in order to minimize the magnitude of that error signal, or drive it to some other reference level. The correction correlator 433 also includes a mixer 445 with an output connected to an accumulator/integrator 447. The mixer 445 receives the same incoming signal from circuits 409 but a different locally generated gating signal through a circuit 417b. An output of the accumulator/integrator 447 is applied to a "perfect" integrator 448 whose accumulated output is the error correction signal 435. The code generator 415 generates gating signals in each of the output lines 417a and 417b that remain synchronized in relative phase with one another as that phase is adjusted relative to the incoming signal in circuits 409 by the compound error signal in circuits 419. These two gating signals are of much different shape, as explained below, which is largely responsible for each of the correlators 411 and 433 having different response characteristics in being able to serve different functions as part of the compound PRN code loop.

The curve of FIG. 14A is an expanded view of the central portion of the response characteristic curve of FIG. 6C of the Prior Application. This shows the magnitude of the error signal output of the primary correlator 411 as a function of a difference in relative phase, in terms of a fraction of a chip of the PRN code, between that of the incoming signal in circuits 409 and the gating signal in the circuit 417a. In order to obtain the response of FIG. 14A, the gating signal in circuits 417a is chosen to be that of FIG. 6E. The pulse of FIG. 6E has a width d=0.1 chip of the PRN code of FIG. 6A, in a specific example. Each such pulse occurs with its center coincident with each edge of the PRN sequence of FIG. 6A, and with a corresponding polarity, when a DLL including the primary correlator 411 is locked in phase. As shown in FIG. 14A, however, a DLL formed only of such a primary correlator locks onto the composite signal 214, rather than the desired line-of-sight signal 213. That is, the zero crossing point of the correlator output characteristic is aligned with the composite signal 214. The code phase that is measured as an indication of distance, position or some other parameter being measured, is then in error. The tracking error is noted in FIG. 14A by $\epsilon$. It is this error that is reduced or eliminated by the correction correlator 433, as explained below.

As an alternative to the response of FIG. 14A, the primary correlator 411 can be made to have a response as shown in FIG. 14B. This response is the same as that of FIG. 9D of the Prior Application. The locally generated code in the circuit 417a that gives the correlator response of FIG. 14B is shown in FIG. 8D. In a specific example, d=0.05 a PRN code chip. The pulse shown in FIG. 8D is made to be symmetrical about each PRN code edge and with the same polarity as that edge. As explained in the Prior Application, the plus and minus areas of the pulse on each side of the PRN code edge are equal to each other. The correlator 411 may alternatively be provided with other response characteristics, such as that shown in FIG. 5D of the Prior Application. Since the primary correlator 411 need not directly compensate for the existence of a multipath signal, its characteristics are chosen to optimize its function as the primary tracking loop.

An example is shown in FIG. 14C of a response of the correction correlator 433 (FIG. 13). This response is obtained when the gating signal in the circuit 417b from the code generator 415 has a shape as illustrated in FIG. 15E. FIG. 14C shows the error correction signal in circuits 435 as a function of a phase difference between the PRN code within the signal in circuits 409 and the locally generated PRN code in the circuit 417b, expressed in terms of a fraction of a chip of the PRN code. A primary characteristic of the response of the FIG. 14C is its narrow late response 451, as previously described with respect to FIG. 9C. In order to operate properly, the duration of the overall response of the correction correlator 433 should be at least equal to the reciprocal of the bandwidth of the receiver down converter 12 (FIG. 4). The correlator response then has an asymmetric nature. It is usual that the correlator response is symmetrical about its zero crossing point but the correction correlator of the present invention provides an early response 453 that has a duration much longer than that of the late response 451. In this way, the bandwidth requirements are met and, at the same time, the late response 451, which is sensitive to the multipath signal, can be made very short. Indeed, the duration of the non-zero late portion 451 of the correction correlator characteristic is ideally made to be slightly greater than the maximum value of the error $\epsilon$, and slightly less than the maximum value of $\delta$, that are expected to be encountered. A correction correlator having the response of FIG. 14C can be used with a primary correlator having a response type that is selected from a number of existing correlator response characteristics, some of which have been described above and in the Prior Application.

An example technique for generating a local PRN code, for use with the correction correlator 433, is shown in FIGS. 15A–15E. FIG. 15A shows an edge 459 of the locally generated reference PRN code. Initially, the gating signal of either of FIGS. 6C or 6D is generated, as shown in FIG. 15B, where $\epsilon_0 = \Delta/2$. That signal is then advanced in phase 0.03 chip to obtain the gating signal of FIG. 15C. The signal of FIG. 15B is also advanced in phase 0.01 chip to obtain the signal of FIG. 15D. The signal of FIG. 15C is then doubled in magnitude, and the signal of FIG. 15D then subtracted therefrom in order to obtain the resulting gating signal of FIG. 15E that is applied by the code generator 415 to the correction correlator 433 through the circuit 417b. The phase of the gating signals in the circuits 417a and 417b (that of FIG. 15E) remain synchronized as their phase relative to the incoming signal is changed in response to the corrected error signal in the circuit 419.

As previously described with respect to FIGS. 9C and 14C, it is the late response characteristic of the correction correlator 433 that is made to be very narrow. Although one of the gating signals of FIGS. 6C or 6D has been described with respect to FIGS. 15A–15E as the starting point in developing a gating signal 417b that gives the desired late correlator response, one of the signals of FIGS. 6E or 6F may alternatively be used. When the signal of FIG. 6E is used, it is advanced in phase by a quantity $(3\Delta/2 - d/2)$, a distance between a reference phase 614 and a phase 616 of FIG. 7D at a leading edge of the trailing slope 617, plus $0.03\Delta$, and then doubled in magnitude. The same gating signal of FIG. 6E is then subtracted from this result after being advanced in phase by $(3\Delta/2 - d/2) + 0.01\Delta$. This result becomes the gating signal 417b for the correction correlator 433.

Of the four beginning gating signal examples shown in FIGS. 6C–6F, that of FIG. 6F is generally preferred as a starting gating signal. When used, the signal of FIG. 6F is advanced in phase by $(\Delta/2-d/2)+0.03\Delta$ and doubled in magnitude, followed by subtracting from this result the same signal of FIG. 6F after being advanced in phase by $(\Delta/2-d/2)+0.01\Delta$. It will be noted from FIG. 7E that the quantity $(\Delta/2-d/2)$ is the distance between a leading edge 620 of a trailing slope of that correlator function and the reference phase 614. Each of the specific correction correlator gating signals 417b described herein is configured to provide a correlator function with a very steep trailing edge (one of edges 612, 615, 617, or 618 of FIGS. 7B–E) beginning at the phase reference 614 of the primary correlator.

It should be noted that there are many other possibilities for gating signals that give a desired correlator response, a proper response being the ultimate goal. For example, only single level signals have been shown in FIGS. 6C–6F but signals having other combinations of magnitudes can alternatively be used.

FIGS. 16A–16C are provided to illustrate operation of the compound code loop of FIG. 13, wherein the primary correlator 411 has a characteristic response as shown in FIG. 14A and the correction correlator 433 has a characteristic response as shown in FIG. 14C. In FIG. 16A, it is assumed that only the line-of-sight signal 213 exists. Under such an ideal circumstance, the zero crossings of both the primary and correction correlator outputs are aligned with the line of sight signal.

However, when the multipath signal 215 first appears, as shown in FIG. 16B for illustrative purposes, the shape of the primary correlator characteristic is distorted. Once the primary correlator has settled after the sudden appearance of the multipath signal, the error $e_M$ in its output 425 is driven to zero by shifting the code generator 415. This is because the primary correlator loop locks onto the composite signal 214 instead of the line-of-sight signal 213. FIG. 16B shows that the correction correlator response initially generates an error output $e_S$, which is then integrated by the integrator 448 (FIG. 13) to produce the error signal 435. The error signal applied to the code generator 415 in circuits 419 is a combination of the errors $e_M + e_S dt$. As more time elapses, the output of the integrator 448 of the correction correlator 433 increases to further offset the primary correlator error signal $e_M$. FIG. 16C illustrates when both of the primary and correction correlator loops are settled. The correction correlator zero crossing is now aligned with the line-of-sight signal 213. It corresponds to the primary correlator zero crossing without any multipath signal component.

The example being illustrated with respect to FIGS. 13–16 provides a high speed primary code tracking loop that includes the primary correlator 411, combined with the low speed multipath correction loop including the correction correlator 433. The correction loop is low speed because it is desirable to integrate the correlated output over relatively long periods of time, when compared to the primary correlator, in order to compensate for a low signal-to-noise ratio in a correction correlator that has a response shown in FIG. 14C. But since the correction loop does not participate in real time code tracking and thus does not have any constraints on its operating dynamics, its response can be chosen to be an extreme function such as shown in FIG. 14C. Others of the correction correlator functions discussed above can alternatively be utilized, as well as others having a non-zero late response that is very short.

By tracking both the primary and correction loops together (locked in phase), the correction loop senses a tracking point error of the primary loop that is the result of the presence of a multipath signal. A combination of the error signals of the two sub-loops then causes the code generator 415 to lock onto the code of the incoming line-of-sight signal, with little or no effect of an incoming multipath signal, depending upon its magnitude and amount $\delta$ of delay in its arrival at the antenna 11.

The curves of FIG. 16C illustrate operation of the compound loop system when the delay $\delta$ between the line-of-sight signal 213 and any multipath signal 215 is greater than the width at the base of the trailing non-zero response 451 of the correction correlator. Under this condition, all of the error created in the primary loop by the presence of the multipath signal is eliminated. It is not unusual, however, for a multipath signal to lie within the correction correlator response 451. In this case, there is some residual error remaining in the compound loop, although at a reduced level. Such a residual error can be reduced through a reduction of the duration of the response portion 451. But, as discussed earlier, there is a limit as to how small the response portion 451 can be made because of effects of the limited bandwidth of the front portions of the receiver. Also, as mentioned earlier, the duration of the response portion 451 should also be wide enough so that the expected composite signal 214 falls within its response in order for the correction loop to operate properly.

The curve in FIG. 17 illustrates a time response of the specific correlation circuit shown in FIG. 13 to the sudden occurrence of a multipath signal. During that initial time period, the corrected error signal in circuits 419 increases at a rate controlled by the time constant $\tau 1$ of the primary loop. Thereafter, the corrected error signal is reduced by the correction loop compensating for that error at a slower rate controlled by the time constant $\tau 2$ of the correction loop. If the multipath signal is such that the correction loop can totally compensate for the effect of the multipath signal, the corrected error signal goes back to zero but it will often result that there is some remaining residual error as shown in FIG. 17. But any such residual error is much less than that of the primary correlator loop alone, thereby showing the benefit of using the correction correlator sub-loop in combination with the primary loop.

Referring to FIG. 18, curves are given to illustrate the relative tracking error boundaries for various multipath signals having different values of delay $\delta$ (nanoseconds) from the line-of-sight signal. The outer curves 463 and 465 show the range of tracking error that is obtained with use of a single code correlator loop having a response as discussed with respect to FIG. 14A. Curves 467 and 469 show an error range of a system using a single code correlator loop with a response as discussed with respect to FIG. 14B. A much reduced tracking error range obtained by using the compound loop of the present invention is shown by a curve 471. The curve 471 illustrates a set of results obtainable with the compound loop of the present invention, using a combination of a primary correlator with characteristics of FIG. 14A and a correction correlator with characteristics of FIG. 14C. The curve 471 shows the range of tracking error (horizontal axis) to much smaller, for a small range of values of $\delta$ near zero, than results from the other prior techniques, and no tracking error at all for most values of $\delta$ outside that range. This improvement allows a GPS receiver to measure a parameter such position with improved accuracy.

Carrier Compound PLL

Referring to FIG. 19, the compound carrier loop of FIG. 12 will be explained in more detail. This compound carrier loop operates on principles similar to those of-the compound code loop, as discussed above, with similar advantages. It is often more important to accurately resolve the relative phase of the carrier since its frequency is higher than that of the codes modulated on it, and thus provides the potential for a higher resolution position measurement to be made. As is typical in GPS signal processing, the incoming signal is demodulated with two sine wave outputs 405a and 405b of the local oscillator 407 that are displaced in relative phase 90 degrees from each other, one designated as the "In-Phase" signal and the other the "Quadrature Phase" signal. The primary correlator 413 and the correction correlator 427 have respective pairs of mixers 475,477 and 479,481 for this purpose. Alternatively, the primary and correction correlators may share a single pair.

The outputs of these mixers then have the carrier removed from the signals, assuming the local carrier reference generating NCO is locked in phase to the carrier of the signal being tracked, the purpose of the compound loop of FIG. 19. A next step in the primary correlator 413 is to mix with the demodulated signals a locally generated replica of a PRN code carried by the signals. (This alternatively could have been done first.) Mixers 483 (in the Q signal path) and 485 (in the I signal path) receive a punctual version 487 of the locally generated code (an example shown in FIG. 6B). Outputs of the mixers 483 and 485 are integrated by respective integrators 489 and 491. The integrated signals are then divided, at 493, to provide an error signal in the path 423 that is the magnitude of the output of the integrator 489 divided by the magnitude of the output of the integrator 491.

This primary correlator 413 is similar to the type generally used in the PLLs of GPS receivers. If only a desired line-of-sight signal is being tracked by such loop, as shown by the single vector in FIG. 20A, the carrier of that signal is aligned with the locally generated I carrier. It is typical that such loops operate to minimize the Q output of the integrator 489 when properly locked in phase. However, if a multipath signal 215 is present along with a line-of-sight signal 213, as shown in the vector diagram of FIG. 20B, with some lag θ in relative phase, the line-of-sight signal 213 is no longer aligned in the I direction. Rather, a composite signal 214 is so aligned. The loop operates to equalize the Q components 495 and 497 of the line-of-sight signal 213 and multipath signal 215, thus causing the line-of-sight signal to be rotated in phase an amount $\epsilon_\theta$ that represents an error.

As a result, the correction correlator 427 is used to determine the amount of such error and correct the primary correlator in order to eliminate or substantially reduce the effect on carrier phase measurement of the presence of a multipath signal. Referring again to FIG. 19, the outputs of the mixers 479 and 481 are applied respectively to mixers 499 and 501. Each of the latter mixers also receive a signal 503 that corresponds to the S3 signal shown in FIG. 15C. The asymmetric nature of the S3 signal gives an asymmetric response characteristic to the correction correlator 427 that allows the determination of the amount of error being caused in the primary correlator output by the presence of the multipath signal. Outputs of the mixers 499 and 501 are applied respectively to accumulators/integrators 503 and 505, whose outputs are in turn combined at 507 to provide a ratio of Q'/I'. That signal is then applied to a "perfect" integrator 509 in order to obtain the error correction signal 429.

Example correlator response characteristics are illustrated in FIGS. 21A and 21B. Each of the Q and I outputs of the primary correlator 413 provides a level shown in the curve of FIG. 21A, as a function of the phase of the composite signal input to the primary correlator 413 relative to that of the locally generated punctual replica P (FIG. 6B) of the code contained in the input signal. Similarly, the magnitude of each of the Q' and I' outputs of the correction correlator 427 is shown in FIG. 21B, as a function of the phase of the line-of-sight signal input to the correction correlator 427 relative to that of the locally generated asymmetric gating signal S3 (FIG. 15C). As the composite carrier loop of FIG. 19 operates, the phases of the locally generated P and S3 code signals are moved together relative to the incoming signal. In place of the S3 signal, as discussed above, one of the signals of FIGS. 6D–6F, after being advanced in phase may be used instead. In this case, the correction correlator shape is given by FIGS. 7C–E. Similar to the code correction correlator discussed above, one of a variety of specific gating signals may be chosen for the carrier correction correlator in order that the correction correlator has a very short non-zero response. As shown in FIG. 21C, such a response 512, as an example, has a duration 516 that is made to be short. As with the code correlator discussed above, the response of the carrier correction correlator that is earlier than a reference phase 514 is not important.

The error correction signal 429 is subtracted from the error signal 423, and then filtered by a filter 511 to obtain the corrected error signal 421 that adjusts the relative phases of the outputs 405a and 405b of the local carrier generator 407. The filtering allows control of the stability of the loop's operation. The result is to eliminate the effect of any multipath signal that falls outside of a small late portion 513 of the triangular response (FIG. 21B) of the correction correlator 427, and to minimize the effect of any multipath signal that falls within the portion 513. As with the compound code loop discussed above, the main tracking function of the compound carrier loop of FIG. 19 is provided by the primary correlator 413. Its response characteristics are designed to do so. The correction correlator 427 is provided with much different response characteristics, particularly a very small late response 513 (FIG. 21B), in order to generate a signal representative of the error in the output of the primary correlator 413 that is due to the existence of a multipath signal. The correction correlator response is not adequate to serve as the only correlator of a loop that tracks the carrier.

In order to illustrate operation of the compound carrier loop of FIGS. 19 and 21A–21B, three-dimensional vector diagrams of FIGS. 22, 23 and 24 are provided. Referring initially to FIG. 22, the primary correlator response characteristic curve of FIG. 21A is shown as 515 in an "I" plane and as 517 in a "Q" plane. The I and Q planes are positioned at right angles to each other. A relative PRN code phase delay is provided along an axis 519 at an intersection of the I and Q planes. A line-of-sight vector 521 at the output of the primary correlator 413 is shown to have an I component 523 and a Q component 525. Because of the presence of a multipath signal 527 within the response characteristics of the primary correlator, the Q component is not zero, thus presenting an error. The multipath signal 527 is delayed from the line-of-sight signal 521 by δ, and makes an angle θ with a line 529 that is parallel with the line-of-sight signal 521. The multipath signal 527 has an I component 531 and a Q component 533. FIG. 22 shows the output of the primary correlator 413 without any contribution from the correction correlator 427. The carrier loop is in equilibrium because the magnitudes of the Q components 525 and 533 of the line-of-sight and multipath signals, respectively, are equal and opposite. But the line-of-sight signal 521 is caused by the presence of the multipath signal to have an error angle $\epsilon_\theta$. This is another representation of the situation illustrated by the two dimensional vector diagram of FIG. 20B, where the line-of-sight and multipath contributions are projected onto the same plane along the "relative PRN code phase delay" axis.

FIG. 23 illustrates, in the same format as FIG. 22 but with a larger scale, the output of the correction correlator. Its response curve of FIG. 21B is shown in the I plane as 535 and in the Q plane as 537. An output from the line-of-sight signal is shown by a vector 539, with a projection 541 on the I axis and a projection 543 on the Q axis. The multipath signal 527 is not within the very small late response of the correction correlator, in this example, so does not affect its output. The ratio of the Q component 543 to the I component 541 is the tangent of the same error angle $\epsilon_\theta$ as appears in FIG. 22. Thus, the error of the primary correlator that is caused by the presence of the multipath signal is measured by the correction correlator. That error is then removed from the output of the primary correlator of FIG. 19 by integrating the error measured by the correction correlator and subtracting the result 429 from the error 423 of the primary correlator. As with the case of the compound code loop described above, compensation for a sudden appearance of a multipath signal occurs over time as accumulation of the error 429 increases.

The end result of combining the outputs of the primary and correction correlators in the compound loop of FIG. 19, after the loop reaches equilibrium, is shown in FIG. 24. This is similar to what is shown in FIG. 22 except both the line-of-sight signal vector 521 and the multipath signal vector 527 have been rotated through the error angle $\epsilon_\theta$ by the self-correcting operation of the compound loop of FIG. 19. A combination Q/I– (Q'/I')dt of the outputs of both the primary and correction correlators is zero. The tracking error caused by the multipath signal has, in this example, been eliminated. Thus, measurements by a GPS receiver which depend upon the carrier phase can be made with much greater accuracy.

An alternative implementation of the correction correlator 427 is shown in FIG. 25. Rather than using two separate sets of mixers and integrators 499, 501, 503 and 505 (FIG. 19) for the Q' and I' signals, a single mixer 651 and a single integrator 653 are used along with multiplexers 655 and 657. In response to a control signal in a line 659, the multiplexer 655 alternately connects the outputs of the mixers 479 and 481 to an input of the mixer 651. Similarly, the multiplexer 657 alternately connects, in synchronism with operation of the multiplexer 655, an output of the integrator 653 to buffer memories 661 and 663. The Q' and I' quantities stored in the buffers 661 and 663 are then divided at 507.

FIG. 26 shows another alternative implementation of the correction correlator 427 of FIG. 19. The correction correlator circuits of these figures are the same except that a different locally generated code signal 487 is used with the I' mixer 501 than the code 503 used with the Q' signal mixer 499. The code 487 is the same as used in the primary correlator 413 (FIG. 19), and is the local reference PRN code of FIG. 6B. The result of the integration 505 is then I, as in the primary correlator 413, rather than I' of the other correction correlator embodiments. The correlation functions of the I correlator of FIG. 26 approximates that of the I' correlator of FIG. 19 but is of a larger scale.

FIGS. 27 and 28 show calculated envelopes of maximum error in the measurement of carrier phase by the system described with respect to FIGS. 19–24. The maximum error (vertical axis) is shown as a function of the delay of the multipath signal (horizontal axis) from the line-of-sight signal. FIG. 27 shows such error when the system is locked onto the C/A code of the received signal, and FIG. 28 when the receiver is locked onto the P-code of the received signal. Outer dashed lines 671 (FIG. 27) and 677 (FIG. 28) show the potential error when the PRN code applied by the line 487 (FIG. 19) to the primary carrier loop correlator 413 corresponds to that of FIG. 6B and the correction correlator is disabled. Intermediate dashed lines 673 (FIG. 27) and 679 (FIG. 28) show that the potential error is less when the correction correlator is enabled and the PRN code applied by the line 503 corresponds to that of FIG. 6F with $\epsilon_\theta$ almost equal to one-half of the PRN code chip. Solid lines 675 (FIG. 27) and 681 (FIG. 28) also show the potential error with use of the PRN code of FIG. 6F but with $\epsilon_\theta$ exactly equal to one-half of the PRN code chip. The specific values of these and other parameters assumed when generating the curves of FIGS. 27 and 28 are given on the figures.

Open Loop Correction System

FIG. 29 shows a receiver that does not correct the DLL code and PLL carrier loops, as is done in the embodiments described above. The system of FIG. 29 is quite similar to that shown in FIG. 12 except that the correction for a multipath signal is made outside of the loops. The code loop 411,415 and the carrier loop 413,407 each lock on a composite of the desired line-of-sight and multipath signals, rather than being corrected to lock on the line-of-sight signal as are the digital channel embodiments described above. The relative code phase output 420 and relative carrier phase output 422 include an error caused by the multipath signal. This error in code phase is corrected by combining with the code phase 420 at 695 the code phase correction signal 419, thereby generating a corrected code phase signal 697. Similarly, the carrier phase 422 is combined at 691 with the carrier phase correction signal 429, in order to provide a corrected carrier phase signal 693.

The results of the FIG. 29 system are quite similar to those of the FIG. 12 system if the code loop, carrier loop and correction circuits are all operating linearly. But since it is usually difficult to compensate for any such non-linearities, it is usually preferred to make the correction a part of the correlation loops as is described in the preceding embodiments. Any non-linearities of the loops are then automatically compensated but the loops may not be operating most efficiently.

Digital Channel Embodiment

Since the code and carrier phase loops have been shown and described separately, FIG. 30 puts them together in a more complete representation of one of the receiver digital channels. Elements of the system of FIG. 30 that correspond to elements shown in earlier drawings are identified by the same reference number but with a prime (') added. A preferred combined implementation by circuitry and software is shown, those functions to the left of a dashed line 551 being performed by one of the channels 13a–n of the receiver of FIG. 4 and those functions to the right of the line 551 being performed by the signal processor 15 under software control.

The local code generator 415' provides four output signals representative of the code carried by the incoming IFW signal. The P and S3 signals in respective lines 487' and 503' have previously been described as used with the carrier correlators 413' and 427'. The primary code correlator 411' is preferably of a narrow type, receiving an appropriate gating signal in a line 553. That gating signal may, for example, be of a form similar to that of FIG. 6E. A further output line 555 of the local code generator 415' carries the s4 gating signal of FIG. 15D. Rather than generating the complicated gating signal of FIG. 15E for use by the code correction correlator, as earlier described with respect to FIG. 13, the code correction correlator 433' receives both of the S3 and S4 gating signals and separately mixes them in mixers 557 and 559. After integration of each of these mixers' outputs, they are combined with an adder 561 after the integrated output of the mixer 557 is doubled in magnitude at 563. The output of the adder 561 is the same as if the gating signal of FIG. 15E was first generated by combining the S3 and S4 gating signals, and this combination then applied to a single mixer with in incoming signal in line $409_Q'$. This implementation uses the mixer 557 and the integrator following it as part of each of the correction correlators 427' and 433'.

Rather than using the S3 (FIG. 15C) and S4 (FIG. 15D) gating signals, which are time shifted replicas of the S signal of FIG. 15B, the local code replica generator 415' could instead generate similarly time shifted replicas of one of the gating signals shown in FIGS. 6D–6F, as previously described.

Although the various aspects of the present invention have been described with respect to its preferred embodiments, it will be understood that the invention is entitled to protection within the full scope of the appended claims.

It is claimed:

1. A method of processing a received signal that includes both line-of-sight and delayed multipath versions of a transmitted signal, comprising:

performing a first correlation of the received signal with a first locally generated reference signal that corresponds to a component of the transmitted signal and provides a first correlation function that is sensitive to both the line-of-sight and delayed multipath versions of the transmitted signal, thereby to obtain a measure of a relative phase of said component, performing a second correlation of the received signal with a second locally generated reference signal that corresponds to said transmitted signal component and provides a second correlation function that is sensitive to the received line-of-sight version of the transmitted signal but insensitive to the delayed multipath version of the transmitted signal, and combining a result of the second correlation with a result of the first correlation in a manner to compensate the measure of the relative phase of said component for an effect of the multipath signal version of the transmitted signal.

2. The method of claim 1, wherein the first and second correlations are performed together as part of a compound lock loop.

3. The method of claim 1, wherein the first and second correlations are performed by independent lock loops and their results combined.

4. The method of claim 1, wherein a relative phase duration of a trailing non-zero response of the second correlation function is made to be significantly less than a trailing non-zero response of the first correlation function.

5. The method of claim 1, wherein the second correlation function is given a lower signal-to-noise ratio than said first correlation function.

6. The method of claim 1, wherein the transmitted signal originates in a satellite and said component of the transmitted signal is a binary pseudo-random code.

7. The method of claim 1, wherein performing the first correlation includes doing so in a first lock loop that generates a first error signal, wherein performing the second correlation includes doing so in a second lock loop that generates a second error signal, and wherein combining the results of the first and second correlations includes combining the first and second error signals to shift together relative phases of the first and second locally generated reference signals.

8. The method of any one of claims 2–5 or 7, wherein the transmitted signal originates in a satellite and said component of the transmitted signal is a binary pseudo-random code.

9. The method of any one of claims 1–5 or 7, wherein the transmitted signal originates in a satellite and said component of the transmitted signal is a carrier signal.

* * * * *